(12) United States Patent
Ishiguro et al.

(10) Patent No.: US 8,089,476 B2
(45) Date of Patent: Jan. 3, 2012

(54) LIQUID CRYSTAL DEVICE

(75) Inventors: Hideto Ishiguro, Shiojiri (JP); Eiji Kanda, Suwa (JP); Hitoshi Ota, Shiojiri (JP)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 12/180,092

(22) Filed: Jul. 25, 2008

(65) Prior Publication Data

US 2009/0033850 A1 Feb. 5, 2009

(30) Foreign Application Priority Data

Aug. 1, 2007 (JP) ................. 2007-200447
Aug. 21, 2007 (JP) ................. 2007-214453

(51) Int. Cl.
*G06F 3/042* (2006.01)
(52) U.S. Cl. .................... 345/175; 345/173; 345/88
(58) Field of Classification Search .................... 345/77, 345/88, 173, 175
See application file for complete search history.

(56) References Cited

U.S. PATENT DOCUMENTS 6,828,951 B2 * 12/2004 Yamazaki et al. ............ 345/77
2006/0077186 A1 * 4/2006 Park et al. .................... 345/173
2006/0109222 A1 * 5/2006 Lee et al. ..................... 345/88
2006/0192766 A1 * 8/2006 Nakamura et al. ........... 345/173

OTHER PUBLICATIONS

Touch Panel Function Integrated LCD Using LTPS Technology, H. Nakamura et al, IDW/AD'05 p. 1003-1006. (2005).

* cited by examiner

*Primary Examiner* — Quan-Zhen Wang
*Assistant Examiner* — Troy Dalrymple
(74) *Attorney, Agent, or Firm* — K&L Gates LLP

(57) ABSTRACT

A liquid crystal device includes a plurality of selection lines, a plurality of signal lines, a plurality of pixel portions, a plurality of photosensor portions, a plurality of first power lines, and a plurality of sense lines. The plurality of selection lines are provided in a line direction. The plurality of signal lines are provided in a column direction. The plurality of pixel portions are provided at positions corresponding to intersections of the selection lines and the signal lines. The plurality of photosensor portions are provided in correspondence with a portion of the plurality of pixel portions. The plurality of first power lines are provided in the line direction. The plurality of sense lines are provided in the column direction. Each of the plurality of pixel portions includes a first switching element and a liquid crystal.

20 Claims, 27 Drawing Sheets

Y DIRECTION

X DIRECTION

LIQUID CRYSTAL DEVICE

RELATED APPLICATIONS

The present application is based on, and claims priority from, Japanese Application Number 2007-200447, filed Aug. 1, 2007, and Japanese Application Number 2007-214453, filed Aug. 21, 2007, the disclosures of which are hereby incorporated by reference herein their entireties.

BACKGROUND

1. Technical Field

The invention relates to a technology of a liquid crystal device with photodetection function, by which the position of a pointing object, such as finger, is located or the region of the pointing object is detected, and also to a technology of an electronic apparatus provided with the liquid crystal device.

2. Related Art

In liquid crystal devices that are widely used as a display device of an electronic apparatus, or the like, a liquid crystal device having a so-called touch panel function has been suggested. In the touch panel function, a photosensor is arranged for each plurality of pixel portions or for each group consisting of a selected number of pixel portions, and thereby it is possible to display an image using light that is transmitted through the pixel portions and to enter information into the liquid crystal device through the pointing object, such as finger. In the above liquid crystal device, the photosensor detects that the pointing object, such as finger or pointing member, contacts the display surface of the liquid crystal device or moves on the display surface. Thus, information may be entered into the liquid crystal device. For example, Touch Panel Function Integrated LCD Using LTPS Technology, N. Nakamura et al, IDW/AD'05 p. 1003-1006 describes a liquid crystal device that is able to display an image through the operation of a driving circuit formed of TFTs each having a low temperature polysilicon (LTPS), and that has a touch panel function by which various pieces of information may be entered on the basis of the image of a pointing object, which is acquired by a photosensor arranged in each pixel.

The photosensor, which is mounted on the above liquid crystal device, is, for example, formed to include a circuitry such that a photodiode and a capacitor are electrically connected to each other. Electric charge stored in the capacitor is discharged depending on a photoelectric current generated in the photodiode that has received an incident light, and the gray-scale level of an image is determined on the basis of an electric potential that has changed because of the discharge. More specifically, for example, the photosensors that are arranged in a region that overlaps the pointing object within the display area in which an image is displayed, that is, the photosensors that are arranged in a region that overlaps the shadow of the pointing object detect the amount of incident light at the shadow of the pointing object, and the photosensors that are arranged in a region that does not overlap the pointing object detect the amount of outside light, which is not blocked by the pointing object, as incident light. Thus, an image having a difference in gray-scale level among pixel portions, depending on a difference in the amount of light, is acquired. Thus, in the liquid crystal device of this type, the amount of incident light that enters the display surface on which an image is displayed is detected, and then the position of the pointing object may be located on the basis of the image consisting of image portions of which the gray-scale levels are determined depending on the amounts of incident light detected by the photosensors.

The detectable range in which the amount of light that may be detected by the photosensors mounted on the liquid crystal device of this type, that is, the range in which the amount of incident light that can generate a photoelectric current corresponding to the amount of incident light is defined through the design of the photosensor. Thus, when the photosensor receives incident light that has an amount of light higher than the detectable range, a photoelectric current generated depending on the amount of light becomes saturated and therefore a variation in voltage generated on the basis of the photoelectric current does not occur. Hence, the image portion of the pointing object cannot be distinguished from another image portion.

In addition, in the display area of the liquid crystal device, when another portion that differs from a pointing object overlaps the pointing object, the shadow of the pointing object and the shadow of the another portion cannot be distinguished from each other.

When an image is formed of only one of a white image portion (bright image with a high gray-scale level) and a black image portion (dark image with a low gray-scale level) on the basis of the amount of incident light received by the photosensors, it is conceivable that the amounts of incident light that enters a plurality of photosensors formed in the display area are adjusted to be uniform to thereby adjust the amounts of incident light detected by the photosensors so as to fall within the detectable range, and, in this way, the gray-scale levels of the image are adjusted so that the image portion of the pointing object may be distinguished from another image portion.

However, in the liquid crystal device of this type, when an image that includes both a white image portion and a black image portion is acquired because of surrounding environment of the pointing object, more specifically, because of the intensity of outside light or the presence of another portion (that is, noise) that overlaps the pointing object, it becomes difficult to determine in which the image portion of the pointing object is included, the white image portion or the black image portion. Thus, a technical problem arises in which it becomes difficult to locate the position of the pointing object by distinguishing the image portion of the pointing object from another image portion.

Particularly, when the image data of an image that includes the image portion of the pointing object have gray-scale levels to a degree such that the image portion of the pointing object may be distinguished, the image portion of the pointing object may be distinguished from another portion by performing various computations on the image data; however, when the amount of light that falls outside the range within which the amount of light can be detected by the photosensor, even the image data that contain the gray-scale level data by which the image portion of the pointing object may be located through the computations cannot be acquired.

Here, it is conceivable that, as in the case of an imaging apparatus, such as a camera, that has a mechanical aperture mechanism and a mechanical shutter mechanism provided midway of the optical system, each photosensor portion is provided with an aperture mechanism and a shutter mechanism. However, it is difficult to reserve a space for providing the aperture mechanism, and the like, at the light receiving side of the photosensor portion along the optical path of incident light. Particularly, in the liquid crystal device of this type, the photosensor portions need to be provided in the display area of the liquid crystal device, so that it is difficult to reserve a space for providing the aperture mechanism, and the like, without deteriorating the display performance of the liquid crystal device, more specifically, without greatly reducing the aperture area through which display light that substantially contribute to displaying an image is transmitted in the display area.

Furthermore, even in an image sensor that detects the image of a detected object, as well as the liquid crystal device that has a touch panel function, there is a technical problem that it becomes difficult to detect the image portion of the detected object by distinguishing the image portion from another image portion.

SUMMARY

An advantage of some aspects of the invention is that it provides a technology for forming a liquid crystal device that has a function of accurately entering various pieces of information through a pointing object, such as finger, by, for example, accurately locating the position or region of the pointing object, such as finger, and also for forming an electronic apparatus provided with the liquid crystal device, without greatly reducing the aperture ratio of the display area.

An aspect of the invention provides a liquid crystal device. The liquid crystal device includes a plurality of selection lines, a plurality of signal lines, a plurality of pixel portions, a plurality of photosensor portions, a plurality of first power lines, and a plurality of sense lines. The plurality of selection lines are provided in a line direction. The plurality of signal lines are provided in a column direction. The plurality of pixel portions are provided at positions corresponding to intersections of the selection lines and the signal lines. The plurality of photosensor portions are provided in correspondence with a portion of the plurality of pixel portions. The plurality of first power lines are provided in the line direction. The plurality of sense lines are provided in the column direction. Each of the plurality of pixel portions includes a first switching element and a liquid crystal. The first switching element loads a display signal supplied through a corresponding one of the signal lines as a selection signal supplied through a corresponding one of the selection lines is asserted. The liquid crystal exhibits a bright state corresponding to the display signal that is loaded by the first switching element. The portion of the plurality of pixel portions adjust the amounts of light that enter the plurality of photosensor portions. Each of the plurality of photosensor portions includes a photoelectric conversion element, a capacitive element, a second switching element, and a readout portion. The photoelectric conversion element generates an electric current of which the magnitude corresponds to the amount of light received. One end of the capacitive element is electrically connected to the photoelectric conversion element. The second switching element resets the one end of the capacitive element to a reset voltage that is supplied through a corresponding one of the first power lines. The readout portion outputs, to a corresponding one of the sense lines, an output signal of which the magnitude corresponds to a voltage of the one end of the capacitive element. The second switching element is controlled to any one of an on state or an off state on the basis of the selection signal that is supplied through the corresponding one of the selection lines.

According to the above aspect of the invention, the second switching element of each photosensor portion serves as a device that supplies a reset voltage to the one end of the capacitive element to initialize the magnitude of the output signal, and the on/off state of the second switching element is controlled using the selection signal that controls the pixel portions. Thus, because the selection lines may also be used as the signal lines for controlling the second switching elements, it is possible to improve the aperture ratio by reducing the number of wirings. In addition, it is not necessary to separately generate control signals for controlling the second switching elements, so that the configuration may be simplified.

In the aspect of the invention, the liquid crystal device may further include a plurality of photosensor selection lines that are provided in the line direction, wherein each readout portion may include a transistor and a third switching element, wherein the transistor generates an output signal of which the magnitude corresponds to a voltage of the one end of the capacitive element, wherein the third switching element is provided between the transistor and a corresponding one of the sense lines, and turns on as a photosensor selection signal supplied to a corresponding one of the photosensor selection lines is asserted, wherein the liquid crystal device may further include a control portion that controls each photosensor portion so that, after the selection signal has been asserted, the photosensor selection signal is asserted to read out a reference light receiving signal onto a corresponding one of the sense lines as the output signal and, after a predetermined time has elapsed since the selection signal has been negated, the photosensor selection signal is asserted to read out a measurement light receiving signal onto the corresponding one of the sense lines as the output signal. In this case, the reference light receiving signal is generated in advance of performing exposure on the photoelectric conversion element, and, after the exposure, the measurement light receiving signal is generated.

In the aspect of the invention, the liquid crystal device may further include a plurality of photosensor selection lines that are provided in the line direction, wherein each readout portion may include a transistor and a third switching element, wherein the transistor generates an output signal of which the magnitude corresponds to a voltage of the one end of the capacitive element, wherein the third switching element is provided between the transistor and a corresponding one of the sense lines, and enters an on state as a photosensor selection signal supplied to a corresponding one of the photosensor selection lines is asserted, wherein the liquid crystal device may further include a control portion that controls each photosensor portion so that, after a predetermined time has elapsed since the selection signal had been switched from assertion to negation, the photosensor selection signal is asserted to read out a measurement light receiving signal onto a corresponding one of the sense lines as the output signal and, after the selection signal has been asserted, a reference light receiving signal is read out onto the corresponding one of the sense lines as the output signal. In this case, the measurement light receiving signal is read first and then the reference light receiving signal is read.

Another aspect of the invention provides a liquid crystal device. The liquid crystal device includes a plurality of selection lines, a plurality of signal lines, a plurality of pixel portions, a plurality of photosensor portions, a plurality of first power lines, and a plurality of sense lines. The plurality of selection lines are provided in a line direction. The plurality of signal lines are provided in a column direction. The plurality of pixel portions are provided at positions corresponding to intersections of the selection lines and the signal lines. The plurality of photosensor portions are provided in correspondence with a portion of the plurality of pixel portions. The plurality of first power lines are provided in the line direction. The plurality of sense lines are provided in the column direction. Each of the plurality of pixel portions includes a first switching element and a liquid crystal. The first switching element loads a display signal supplied through a corresponding one of the signal lines as a selection signal supplied through a corresponding one of the selection lines is asserted. The liquid crystal exhibits a bright state corresponding to the display signal that is loaded by the first switching element. The portion of the plurality of pixel portions adjust the amounts of light that enter the plurality of photosensor portions. Each of the plurality of photosensor portions includes a photoelectric conversion element, a capacitive element, a second switching element, a transistor, and a third switching element. The photoelectric conversion element generates an electric current of which the magnitude corresponds to the amount of light received. One end of the capacitive element is electrically connected to the photoelectric conversion element. The second switching element resets the one end of the capacitive element to a reset voltage that is supplied through a corresponding one of the first power lines. The transistor generates an output signal of which the magnitude corresponds to a voltage of the one end of the capacitive element. The third switching element is provided between the transistor and a corresponding one of the sense lines. The third switching element is controlled to any one of an on state or an off state on the basis of the selection signal that is supplied through a corresponding one of the selection lines.

According to the above aspect of the invention, the third switching element of each photosensor portion serves as a device that selects whether the output signal is supplied to the sense line, and the on/off state of the third switching element is controlled using the selection signal that controls the pixel portions. Thus, because the selection lines may also be used as the signal lines for controlling the third switching elements, it is possible to improve the aperture ratio by reducing the number of wirings. In addition, it is not necessary to separately generate control signals for controlling the third switching elements, so that the configuration may be simplified.

In the aspect of the invention, the liquid crystal device may further include a plurality of reset signal lines that are provided in the line direction, wherein the liquid crystal device may further include a control portion that controls each photosensor portion so that, after the selection signal and a reset signal that is supplied through a corresponding one of the reset signal lines have been asserted, a reference light receiving signal is read out onto a corresponding one of the sense lines as the output signal and, after a predetermined time has elapsed since the reset signal had been negated, the selection signal is asserted to read out a measurement light receiving signal onto the corresponding one of the sense lines as the output signal. In this case, the reference light receiving signal is generated in advance of performing exposure on the photoelectric conversion element, and, after the exposure, the measurement light receiving signal is generated.

In addition, the liquid crystal device may further include a plurality of reset signal lines that are provided in the line direction, wherein the liquid crystal device may further include a control portion that controls each photosensor portion so that, after a predetermined time has elapsed since a reset signal that is supplied through a corresponding one of the reset signal lines had been switched from assertion to negation, the photosensor selection signal is asserted to read out a measurement light receiving signal onto a corresponding one of the sense lines as the output signal and, after the selection signal has been asserted, a reference light receiving signal is read out onto the corresponding one of the sense lines as the output signal. In this case, the measurement light receiving signal is read first and then the reference light receiving signal is read.

Here, the control portion may output a difference between the reference light receiving signal and the measurement light receiving signal as a detected light receiving signal. Because the reset voltage is constant, the difference between the output signals is the amount of light received by the photoelectric conversion element during a predetermined exposure period.

In addition, in the above described liquid crystal device, each of the plurality of pixel portions may include a holding capacitive element that holds the display signal, wherein one end of the holding capacitive element may be electrically connected to the first switching element, wherein the other end of the holding capacitive element may be electrically connected to a corresponding one of the first power lines. In this case, the wiring that supplies a certain voltage to the holding capacitive element and the first power line may be integrated, so that the number of wirings is further reduced to make it possible to improve the aperture ratio.

In addition, in the above described liquid crystal device, the liquid crystal device may further include a plurality of second power lines that are provided in the line direction, wherein the other end of the photoelectric conversion element may be electrically connected to a corresponding one of the second power lines, wherein each of the plurality of pixel portions may include a holding capacitive element that holds the display signal, wherein one end of the holding capacitive element may be electrically connected to the first switching element, wherein the other end of the holding capacitive element may be electrically connected to a corresponding one of the second power lines. In this case, the wiring that supplies a certain voltage to the holding capacitive element and the second power line may be integrated, so that the number of wirings is further reduced to make it possible to improve the aperture ratio.

Further another aspect of the invention provides a liquid crystal device. The liquid crystal device includes a plurality of selection lines, a plurality of signal lines, a plurality of first pixel portions, a plurality of second pixel portions, a plurality of photosensor portions, a plurality of first power lines, and a plurality of sense lines. The plurality of selection lines are provided in a line direction. The plurality of signal lines are provided in a column direction. The plurality of first pixel portions are provided at positions corresponding to intersections of the selection lines and the signal lines. The plurality of second pixel portions are provided at positions corresponding to intersections of the selection lines located at every K lines (K is natural number) and the signal lines. The plurality of photosensor portions are provided in correspondence with a portion of the plurality of second pixel portions. The plurality of first power lines are provided in the line direction. The plurality of sense lines are provided in the column direction. Each of the plurality of first pixel portions and second pixel portions includes a first switching element and a liquid crystal. The first switching element loads a display signal supplied through a corresponding one of the signal lines as a selection signal supplied through a corresponding one of the selection lines is asserted. The liquid crystal exhibits a bright state corresponding to the display signal that is loaded by the first switching element. The plurality of second pixel portions adjust the amounts of light that enter the plurality of photosensor portions. Each of the plurality of photosensor portions includes a photoelectric conversion element, a second switching element, and a readout portion. The photoelectric conversion element generates an electric current of which the magnitude corresponds to the amount of light received. The second switching element resets one terminal of the photoelectric conversion element to a reset voltage that is supplied through a corresponding one of the first power lines. The readout portion outputs, to a corresponding one of the sense lines, an output signal of which the magnitude corresponds to a voltage of the one terminal of the photoelectric conversion element. The switching element is controlled to any one of an on state or an off state on the basis of the selection signal that is supplied through a corresponding one of the selection lines located at every K lines.

According to the above aspect of the invention, one photosensor portion is provided in correspondence with the first pixel portions located at every K lines. In addition, the second switching element of each photosensor portion serves as a device that supplies a reset voltage to the one terminal of the photoelectric conversion element to initialize the magnitude of the output signal, and the on/off state of the second switching element is controlled using the selection signal that controls the first pixel portions located at every K lines. Thus, because the selection lines may also be used as the signal lines for controlling the second switching element, it is possible to improve the aperture ratio by reducing the number of wirings. In addition, it is not necessary to separately generate control signals for controlling the second switching elements, so that the configuration may be simplified. Note that a holding device that holds electric charge may be provided at the one terminal of the photoelectric conversion element. In this case, the holding device may be formed of a capacitive element or may be formed of the parasitic capacitance of a wiring or an active element.

In the aspect of the invention, K may be 1, wherein each second switching element may be controlled to any one of an on state or an off state on the basis of the selection signal that is supplied through any one of successive two selection lines. In this case, the second pixel portion is provided for one out of every two lines.

In addition, the readout portion may include an amplification transistor and a switching device, wherein the amplification transistor generates an output electric current of which the magnitude corresponds to a voltage of the one terminal of the photoelectric conversion element, wherein the switching device is provided between the amplification transistor and a corresponding one of the sense lines, and turns on as a photosensor selection signal that is supplied to a corresponding one of the selection lines is asserted, wherein the liquid crystal device may further include a control portion that controls each photosensor portion so that, as a selection signal supplied through the selection line of the one of any successive two lines has been asserted, a reference light receiving signal is read out onto the corresponding one of the sense lines as the output current and, after a predetermined time has elapsed since the selection signal supplied through the selection line of the one of any successive two lines had been negated, a measurement light receiving signal is read out onto the corresponding one of the sense line as the output current. In this case, the reference light receiving signal is generated in advance of performing exposure on the photoelectric conversion element, and, after the exposure, the measurement light receiving signal is generated.

In the above aspect, the switching device may include a third switching element and a fourth switching element, wherein the third switching element is provided between the amplification transistor and a corresponding one of the sense lines and is controlled to any one of an on state or an off state by the selection signal that is supplied through the selection line of one of any successive two lines, wherein the fourth switching element is provided between the amplification transistor and the corresponding one of the sense lines and is controlled to any one of an on state or an off state by a selection signal that is supplied through the selection line of the other one of any successive two lines. In this case, as any one of the third switching element or the fourth switching element enters an on state, a signal is output to the sense line.

Here, the selection line of the one of any successive two lines may be the selection line such that a selection signal supplied therethrough is asserted first between the successive two selection lines, wherein the control portion may control the fourth switching element so that a selection signal supplied through the selection line of the other one of any successive two lines between the successive two selection lines is asserted second to read out a measurement light receiving signal onto a corresponding one of the sense lines as the output current. In this case, it takes relatively short time from the reset until the measurement light receiving signal is read.

In addition, the selection line of one of any successive two lines may be the selection line such that a selection signal supplied therethrough is asserted second between the successive two selection lines, wherein the control portion may control the third switching element so that a selection signal that is supplied through the selection line of the other one of any successive two lines is asserted after substantially one frame period has elapsed since a selection signal that is supplied to the selection line of the one of any successive two lines had been asserted to read out a measurement light receiving signal onto a corresponding one of the sense lines as the output current. In this case, it takes relatively long time from the reset until the measurement light receiving signal is read.

The liquid crystal device may further include a backflow prevention diode that is connected in series with the photoelectric conversion element. In this manner, it is possible to prevent an increase in power consumption due to an electric current that flows when the photoelectric conversion element is biased in a forward direction.

Here, the control portion may output a difference between the reference light receiving signal and the measurement light receiving signal as a detected light receiving signal. Because the reset voltage is constant, the difference between the output signals is the amount of light received by the photoelectric conversion element during a predetermined exposure period.

In addition, each of the plurality of first pixel portions may include a holding capacitive element that holds the display signal, wherein one end of the holding capacitive element may be electrically connected to the first switching element, wherein the other end of the holding capacitive element that is included in each first pixel portion of each one of successive two lines may be connected to a corresponding one of the first power lines. In this case, the wiring that supplies a certain voltage to the holding capacitive element and the first power line may be integrated, so that the number of wirings is further reduced to make it possible to improve the aperture ratio.

Furthermore, the liquid crystal device may further include a plurality of second power lines, each of which is provided for the other one of the successive two lines, wherein the other terminal of each photoelectric conversion element may be electrically connected to the second power line of the other one of the successive two lines, wherein the electric potential supplied through each second power line may be lower than the electric potential of a reset voltage supplied through each first power line. In this case, a reverse bias may be applied to each photoelectric conversion element, and the wirings that supply an electric potential necessary for the above may also serve as the second power lines that supply an electric potential to the holding capacitive element. In this manner, the number of wirings is further reduced to make it possible to improve the aperture ratio.

In addition, in the above described liquid crystal device, the liquid crystal device may further include a capacitive element that is connected to the one terminal of the photoelectric conversion element. Yet another aspect of the invention provides an electronic apparatus that includes the above described liquid crystal device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of each of a liquid crystal device and an electronic apparatus according to the invention will be described with reference to the accompanying drawings.

1: Liquid Crystal Device 1-1: Configuration of Liquid Crystal Device

Figure 1:
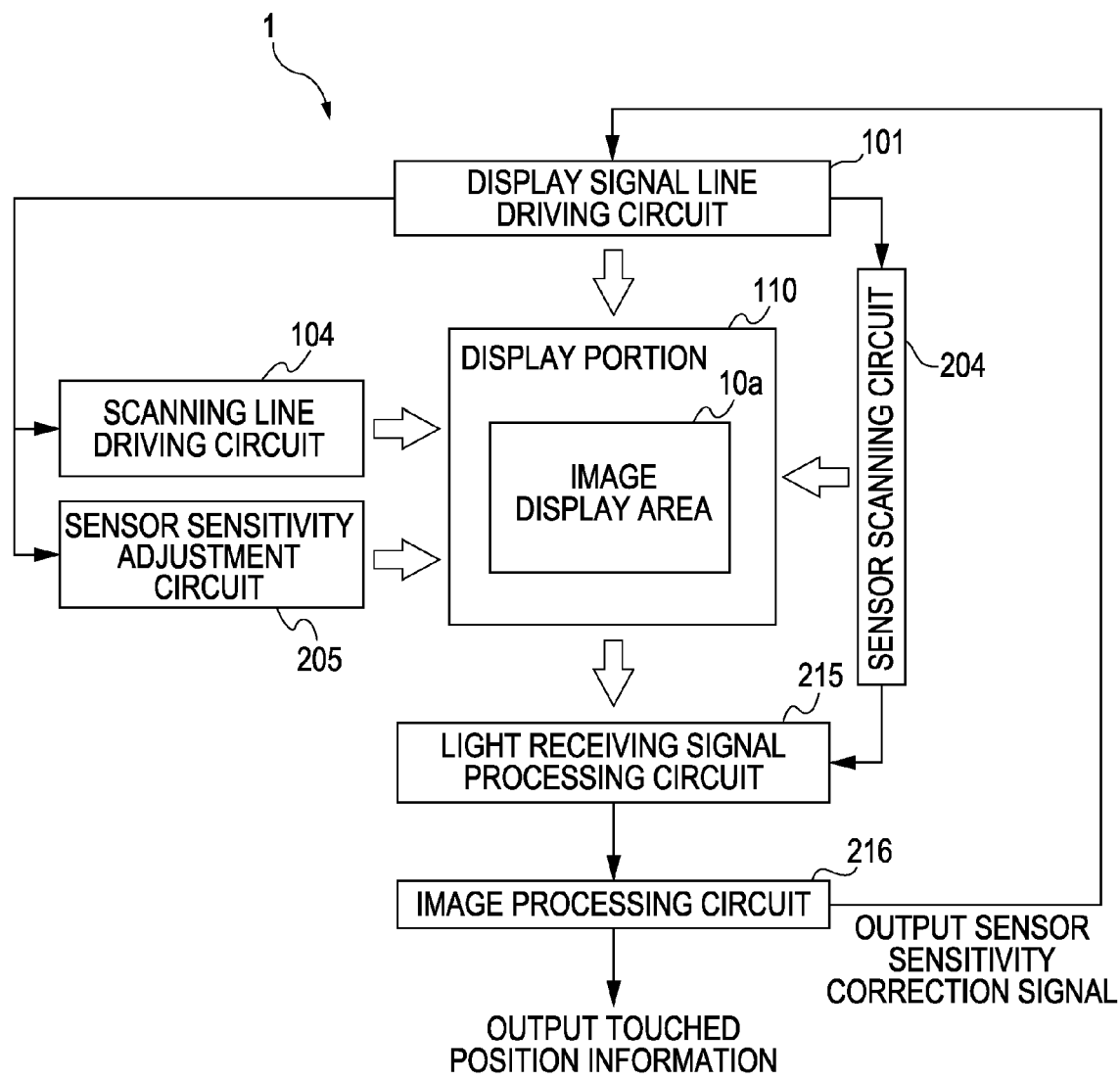
FIG. 1 is a block diagram that shows the basic circuit configuration of a liquid crystal device according to a present embodiment.

First, the major configuration of the liquid crystal device 1 according to the present embodiment will be described. The liquid crystal device 1 according to the present embodiment internally includes driving circuits and is driven in a TFT active matrix driving method. FIG. 1 is a block diagram that shows the major configuration of the liquid crystal device 1. In the drawing, the liquid crystal device 1 has a display portion 110 that includes a display signal line driving circuit 101, a scanning line driving circuit 104, a sensor sensitivity adjustment circuit 205, a sensor scanning circuit 204, a light receiving signal processing circuit 215, an image processing circuit 216 and an image display area 10a.

The image display area 10a of the display portion 110 is configured to include a plurality of pixel portions that are arranged in a matrix, as will be described later. The display signal line driving circuit 101 and the scanning line driving circuit 104 respectively supply image signals and scanning signals to the display portion 110 at a predetermined timing to drive the pixel portions. The sensor scanning circuit 204, when the liquid crystal device 1 is operating, supplies photosensor portions 150 (see FIG. 2), which will be described later, with signals that allow the photosensor portions 150 to operate. The light receiving signal processing circuit 215 processes light receiving signals that are output from the photosensor portions 150.

The image processing circuit 216 processes image data on the basis of processed signals that are supplied from the light receiving signal processing circuit 215. When the image processing circuit 216 determines an image on the basis of the light receiving signals of the plurality of the photosensor portions 150 of the display portion 110 to thereby distinguish a pointing object, such as finger, that points to the display surface of the display portion 110, the position of the pointing object that points to the display surface is located and then the located position is output to an external circuit (not shown) as touched position information. On the other hand, when the position of the pointing object cannot be located, a correction signal that corrects the sensitivity of the photosensor portions 150 is supplied to the display signal line driving circuit 101. On the basis of that correction signal, light amount adjustment portions 82, which will be described later, each adjust the amount of aperture to which the amount of incident light is reduced in each light amount adjustment portion.

1-2: Configuration of Pixel Portions

Figure 2:
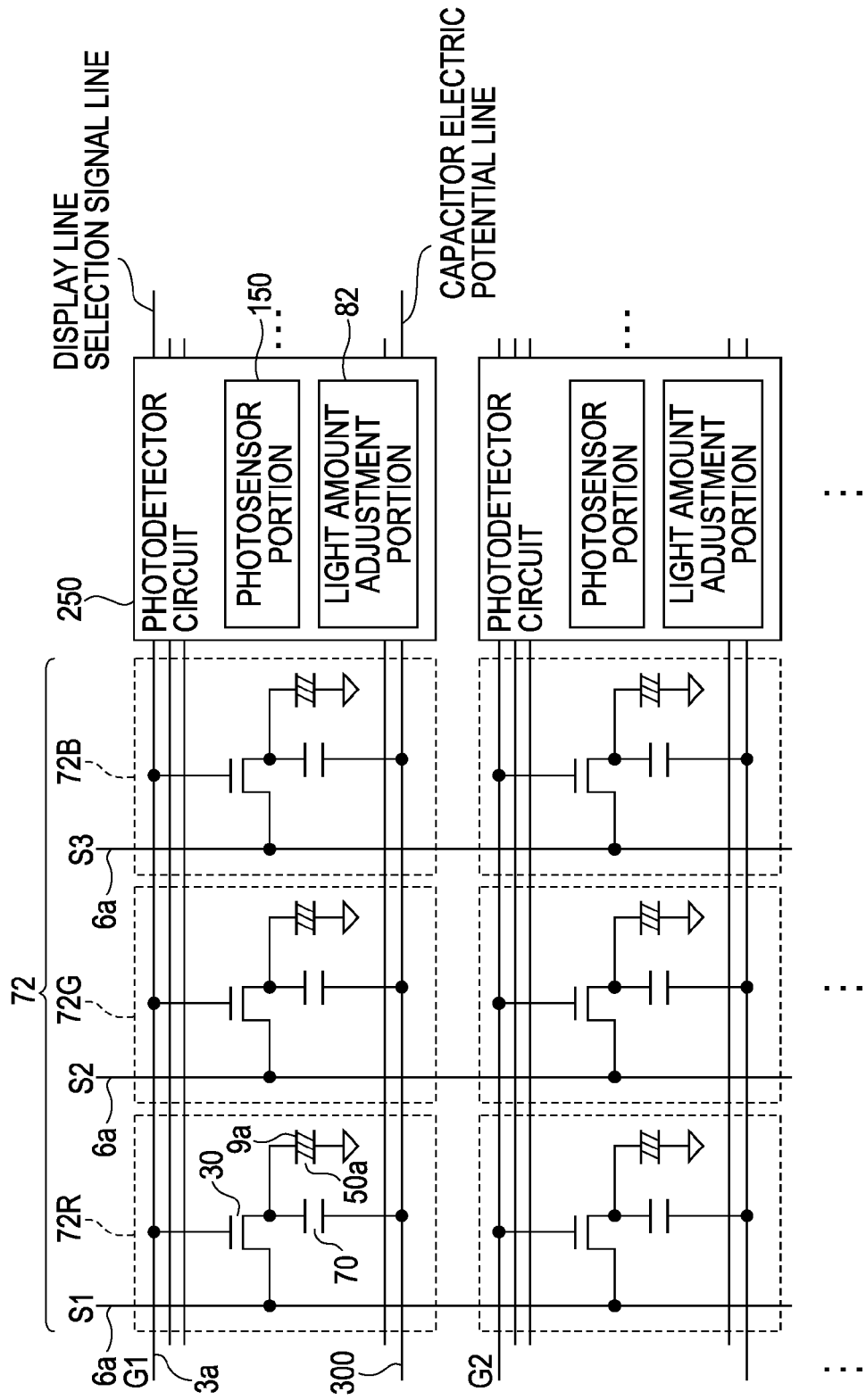
FIG. 2 is an equivalent circuit provided in an image display area of the liquid crystal device according to the present embodiment.
Figure 3:
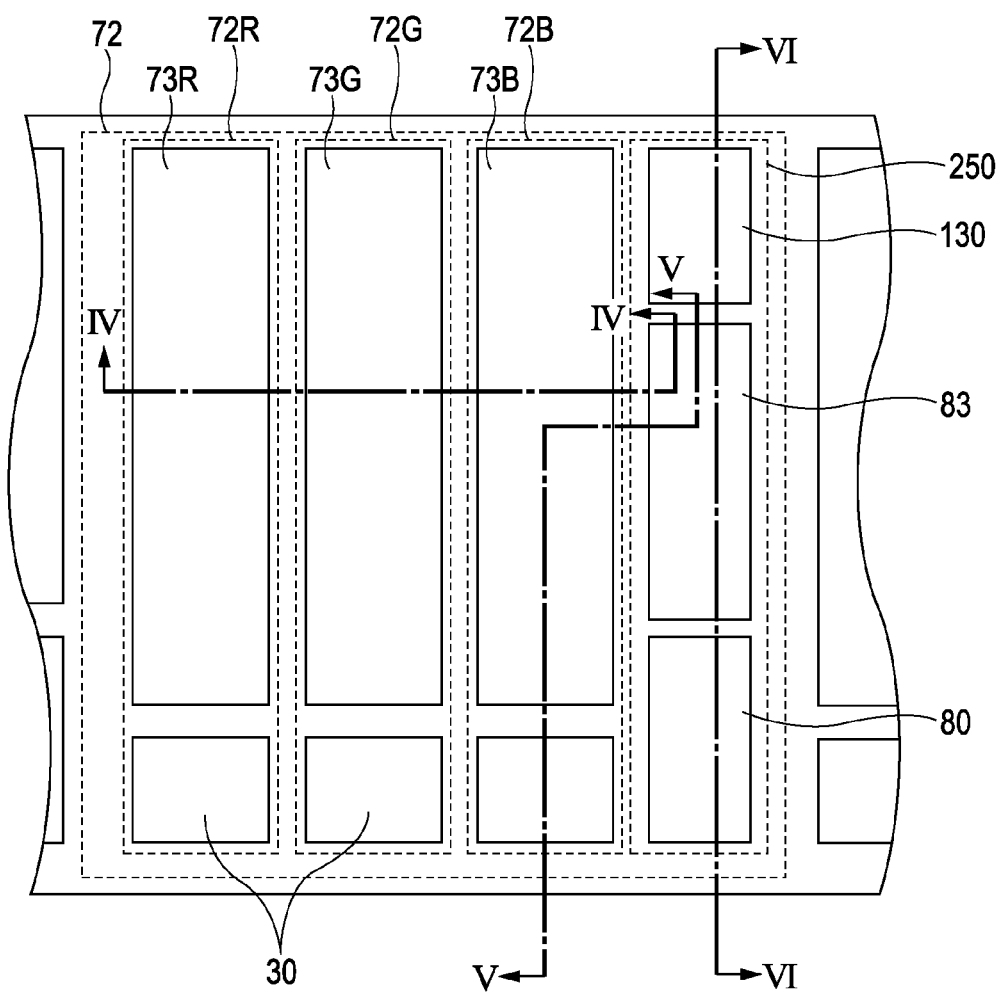
FIG. 3 is a diagrammatic plan view of pixel portions of the liquid crystal device according to the present embodiment.
Figure 4:
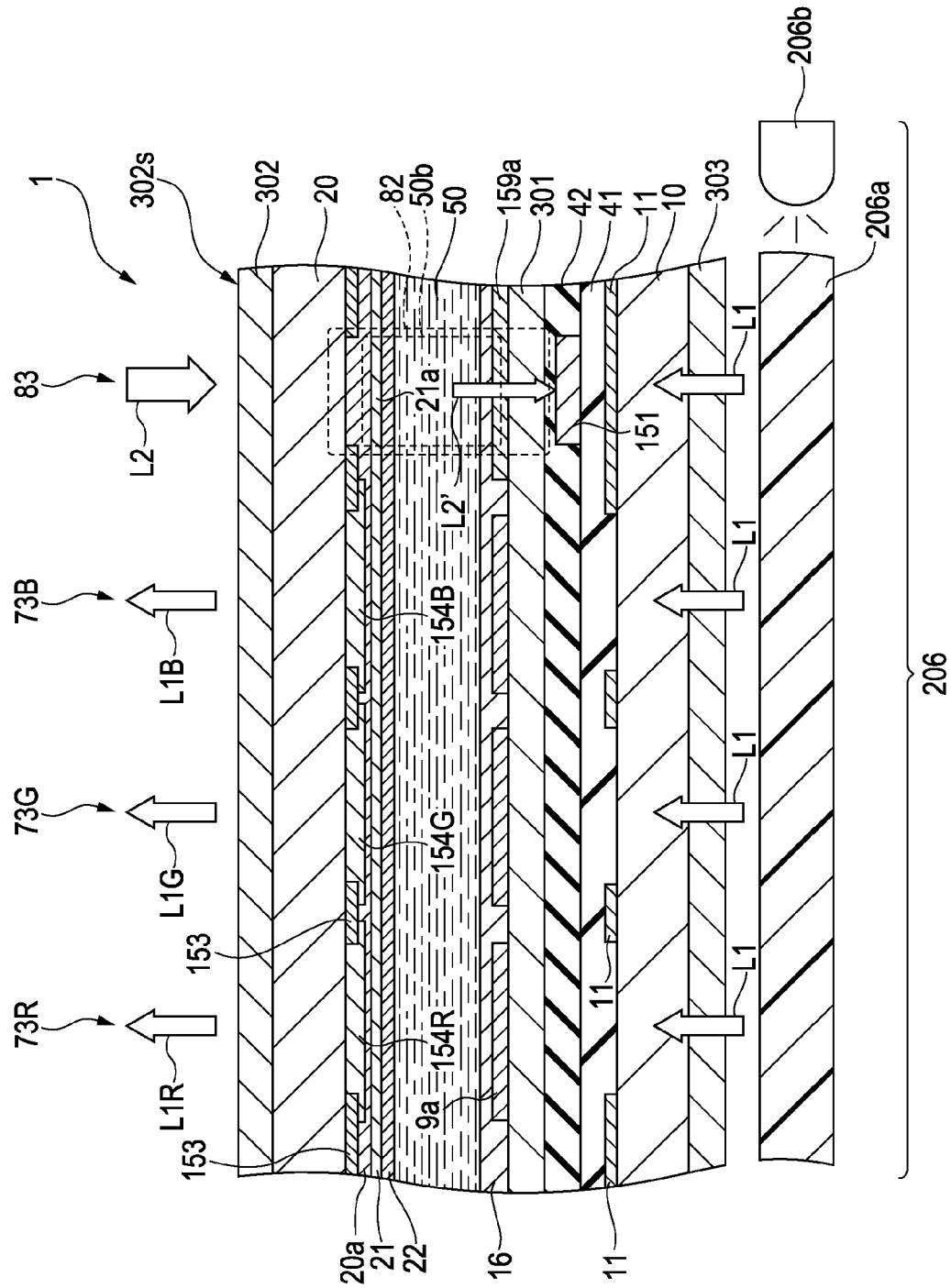
FIG. 4 is a cross-sectional view that is taken along the line IV-IV in FIG. 3.
Figure 5:
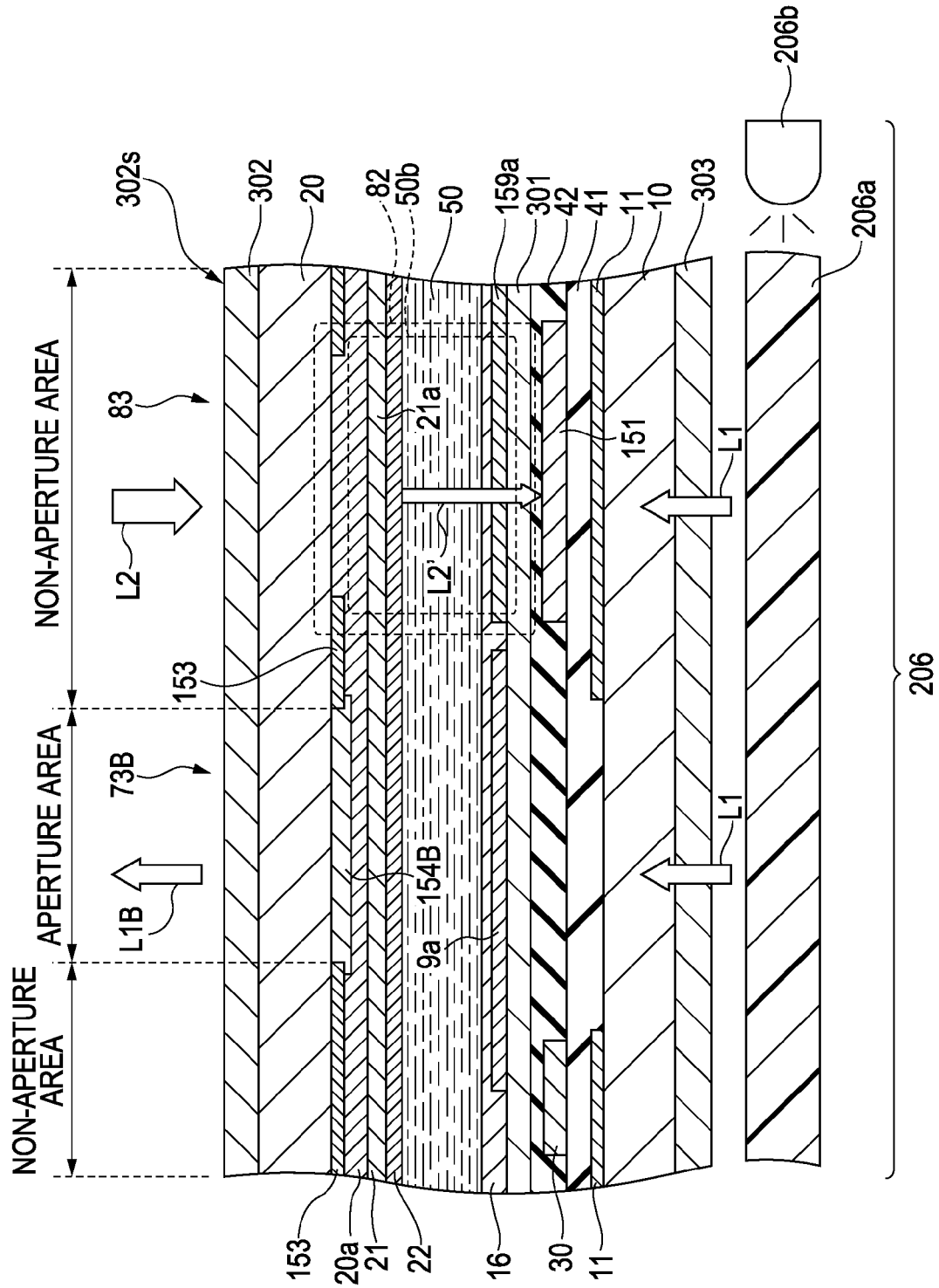
FIG. 5 is a cross-sectional view that is taken along the line V-V in FIG. 3.
Figure 6:
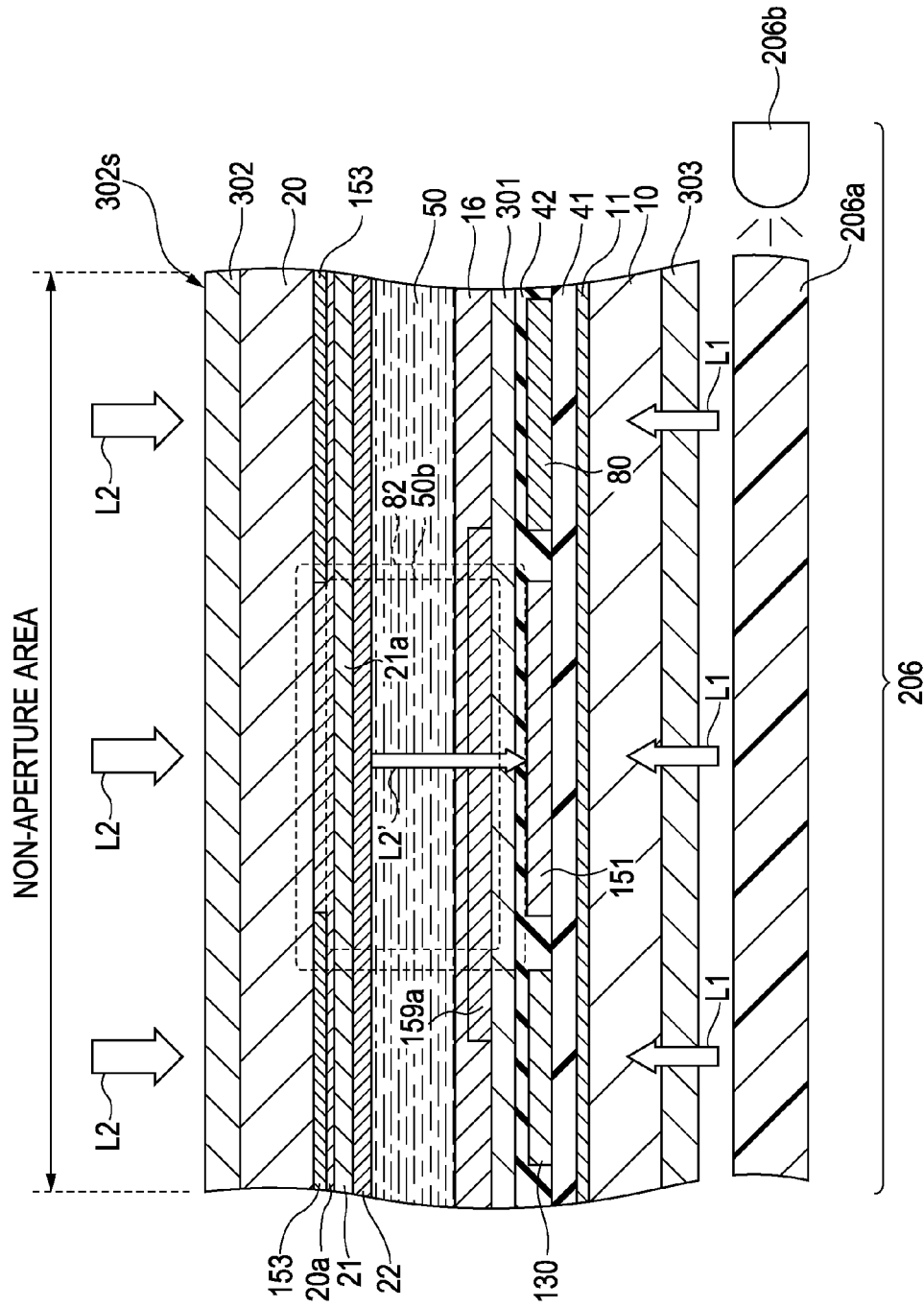
FIG. 6 is a cross-sectional view that is taken along the line VI-VI in FIG. 3.
Figure 7:
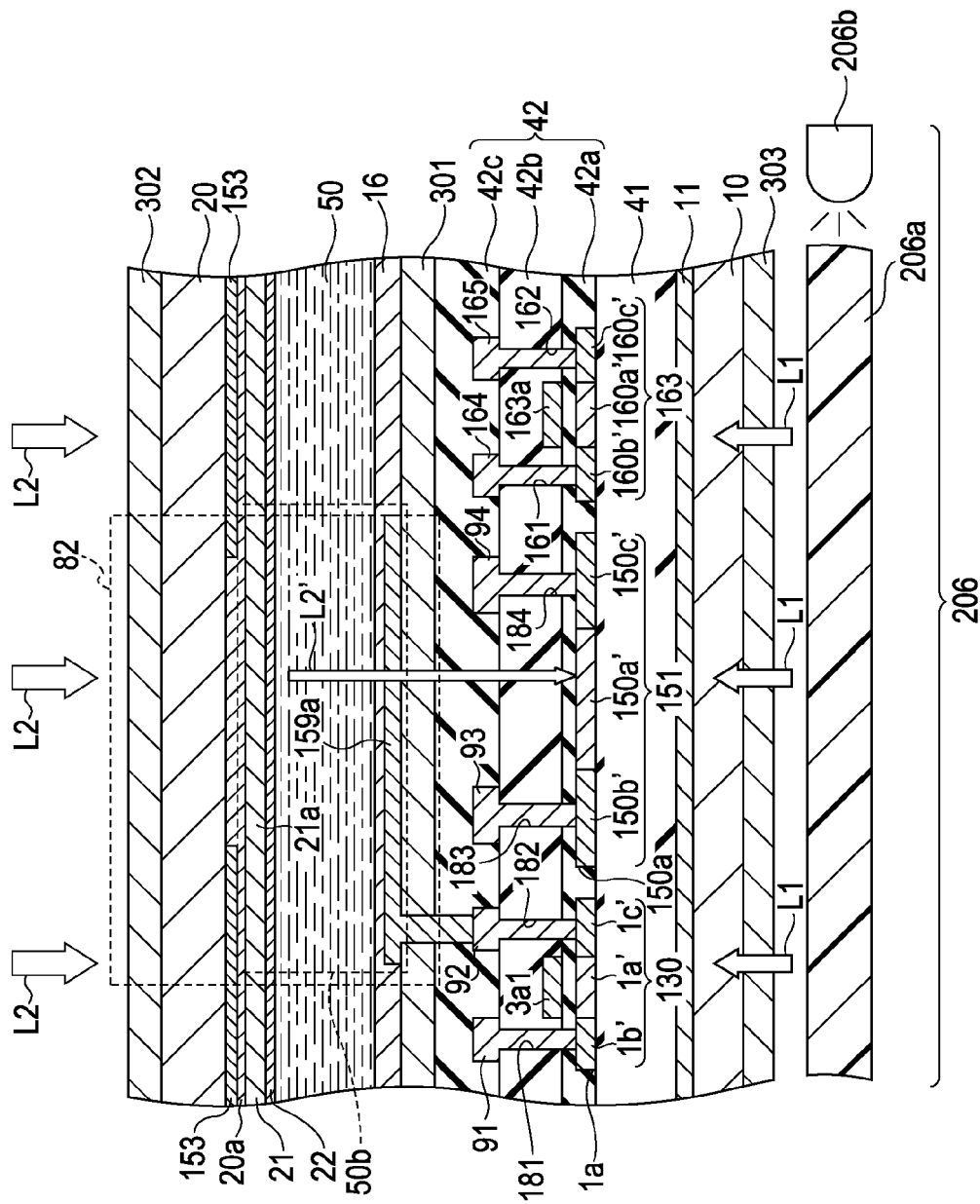
FIG. 7 is a cross-sectional view that shows the details of the cross-sectional view shown in FIG. 6.

The configuration of the pixel portions of the liquid crystal device 1 will now be described in detail. FIG. 2 is an equivalent circuit of various elements, wirings, and the like, provided in the plurality of pixels that are formed in a matrix and that constitute the image display area 10*a* of the liquid crystal device 1. In the drawing, among the plurality of pixel portions that are arranged on a TFT array substrate in a matrix, the circuitry of portions that actually contribute to image display and the photodetector circuits 250 are shown. FIG. 3 is a schematic plan view of the pixel portions. FIG. 4 is a cross-sectional view that is taken along the line IV-IV in FIG. 3. FIG. 5 is a cross-sectional view that is taken along the line V-V in FIG. 3. FIG. 6 is a cross-sectional view that is taken along the line VI-VI in FIG. 3. FIG. 7 is a cross-sectional view that shows the details of the cross-sectional view shown in FIG. 6. In FIG. 4 to FIG. 7, to make it easier to recognize layers and components in the drawings, the scales of the layers and components are varied.

In FIG. 2, each of the plurality of pixel portions 72 that are formed in a matrix and that constitute the image display area 10*a* of the liquid crystal device 1 is formed to include a sub-pixel portion 72R that displays red color, a sub-pixel portion 72G that displays green color, and a sub-pixel portion 72B that displays blue color. Thus, the liquid crystal device 1 is a display device that is capable of displaying color images. Each pixel portion 72 is electrically connected to a corresponding one of the photodetector circuits 250 that are formed in the image display area 10*a*. The manner of electrical connection will be described later. Each photodetector circuit 250 includes a photosensor portion 150 and a light amount adjustment portion 82. Each of the sub-pixel portions 72R, 72G and 72B includes a pixel electrode 9*a*, a TFT 30, a storage capacitor 70, and a liquid crystal element 50*a* that is held by the pixel electrode 9*a*.

The TFT 30 is electrically connected to the pixel electrode 9*a*, and performs switching control over the pixel electrode 9*a* when the liquid crystal device 1 is operating. Display signal lines 6*a*, to which image signals are supplied, are electrically connected to the sources of the TFTs 30. The image signals S1, S2, . . . , written to the display signal lines 6*a*, may be supplied in a line sequential manner in this order or may be supplied to each group consisting of a plurality of adjacent display signal lines 6*a*.

The gate of each TFT 30 is electrically connected to the display line selection signal line 3*a*. The liquid crystal device 1 is configured to apply the scanning signals G1, G2, . . . , to the display line selection signal lines 3*a* in pulse form at a predetermined timing in a line sequential manner in this order. Each pixel electrode 9*a* is electrically connected to the drain of the TFT 30. When the switch of the TFT 30, which is a switching element, is closed at a prescribed period of time, the image signals S1, S2, . . . , supplied from the display signal lines 6*a*, are written at a predetermined timing. The image signals S1, S2, . . . , with a predetermined level, each of which is written to the liquid crystal element 50*a* through the pixel electrode 9*a* are held for a prescribed period of time between the pixel electrode 9*a* and an opposite electrode that is formed on an opposite substrate.

Each liquid crystal element 50*a*, which is held by the pixel electrode 9*a*, modulates light in such a manner that alignment or order of molecular association is changed depending on an applied voltage level, thus enabling grayshade. In a normally white mode, the transmittance ratio of incident light reduces depending on a voltage applied to each sub-pixel portion. In a normally black mode, the transmittance ratio of incident light increases depending on a voltage applied to each sub-pixel portion. As a whole, light having a contrast corresponding to the image signals is emitted from the liquid crystal device 1. The storage capacitor 70 is additionally arranged in parallel with each liquid crystal element 50*a* that is formed between the pixel electrode 9*a* and the opposite electrode in order to prevent leakage of an image signal. The capacitor electric potential line 300 is a fixed electric potential side electrode between the pair of electrodes of the storage capacitor 70. Note that, when the leakage of image signals is non-problematic because of the case in which the capacitance of the liquid crystal element 50*a* is sufficiently large or because of parasitic capacitance, the storage capacitor 70 need not be provided.

As shown in FIG. 3, each pixel portion 72 includes three sub-pixel portions 72R, 72G and 72B, which are arranged in an X direction, and the photodetector circuit 250. The sub-pixel portions 72R, 72G and 72B respectively include apertures 73R, 73G and 73B. When the liquid crystal device 1 is operating, red light, green light and blue light are respectively emitted from the apertures 73R, 73G and 73B to thereby enable the liquid crystal device 1 to display color images. In addition, each of the sub-pixel portions 72R, 72G and 72B includes the TFT 30 that performs switching of the sub-pixel portion.

Each photodetector circuit 250 includes an adjustment control TFT 130, an aperture 83, and a TFT circuit 80. The photodetector circuit 250 detects incident light that enters the display surface. The TFT circuit 80 includes a reset TFT 163, which will be described later, a voltage amplification TFT 154, and an output control TFT 155. The TFT circuit 80 controls operation of the light receiving element 151 that faces the aperture 83, and supplies a sensing signal line 6*a*2 with a variation in voltage corresponding to a photoelectric current generated by the light receiving element 151.

In FIG. 4 to FIG. 7, the liquid crystal device 1 includes light shielding films 11 and 153, three kinds of color filters 154R, 154G and 154B that are embedded in a planarizing film 20*a*, the liquid crystal elements 50*b*, the light receiving elements 151, a backlight 206, a first polarizing layer 301, a second polarizing layer 302, and a third polarizing layer 303. The backlight 206 includes a light guide plate 206*a* and a display light source 206*b*, and is arranged below the TFT array substrate 10.

The display light source 206*b* generates display light L1 for displaying an image on the image display area 10*a*. The display light L1 is a visible light and is modulated by the liquid crystal layer 50 in accordance with driving of each sub-pixel portion. The light guide plate 206*a* is, for example, formed of acrylic resin that is able to transmit the display light L1, and guides the display light L1 to the image display area 10*a*. The liquid crystal device 1 uses the display light L1 to display images, and uses the display light L1 and outside light to detect a pointing object F.

The first polarizing layer 301 and the second polarizing layer 302 each constitute portion of each light amount adjustment portion 82, and are arranged in the vertical direction in the drawing on both sides of each liquid crystal element 50b. The first polarizing layer 301 and the second polarizing layer 302 are arranged in crossed-Nichols such that the optical axes of the polarizing layers intersect perpendicularly with each other. Each liquid crystal element 50b includes a liquid crystal portion, a first electrode 159a and a second electrode 21a. The liquid crystal portion is portion of the liquid crystal layer 50, which overlaps a corresponding one of the light receiving elements 151. The first electrode 159a and the second electrode 21a hold the liquid crystal portion in between.

Each light amount adjustment portion 82 serves as an aperture mechanism that adjusts the amount of incident light L2 that enters the aperture 83 from the display surface 302s. In the present embodiment, as will be described later in detail, because the alignment state of the liquid crystal portion of each liquid crystal element 50b may be controlled, the amount of the incident light L2 may be adjusted separately in each light amount adjustment portion 82. As in the case in which the intensity of display light is controlled by controlling the alignment state of the liquid crystal layer in each pixel, the amount of incident light L2' that enters the light receiving element 151 of each photosensor portion 150 may be adjusted separately.

Thus, with the plurality of light amount adjustment portions 82, even when each of the amounts of incident light L2 that enters from the display surface 302s falls outside the detectable range, within which each photosensor portion 150 is able to detect the amount of light, in each of a plurality of areas that constitute the image display area 10a, the amount of incident light that enters each photosensor portion 150 may be adjusted for each photosensor portion 150 or for each group consisting of a selected number of photosensor portions 150 so as to allow the amount of incident light that enters each photosensor portion 150 to fall within the detectable range.

Particularly, in each of the plurality of areas that constitute the image display area 10a, when a pointing object cannot be distinguished from its surroundings because of a change of environment, such as outside light that is blocked by the pointing object, such as finger, more specifically, for example, when the amount of incident light L2 that enters both an area on the display surface 302s, on which the shadow of the pointing object is projected, and an area around that area falls outside the detectable range within which the amount of light can be detected by the light receiving element 151 because of the amount of outside light is too strong, the light amount adjustment portions 82 adjust the amount of incident light L2 that enters both the area on which the shadow of the pointing object is projected and the area around that area so that the amount of incident light is shifted into the detectable range. That is, each of the plurality of light amount adjustment portions 82 serves as an aperture mechanism that is able to separately adjust the amount of incident light L2 that enters a corresponding one of the photosensor portions 150.

In this manner, according to the liquid crystal device 1, even when the amount of incident light L2 that enters the photosensor portions 150 falls outside the detectable range of the photosensor portions, the amount of the incident light 12 is adjusted so as to fall within the detectable range, and then the incident light L1, of which the amount of light is adjusted into the detectable range, is irradiated to the photosensor portions 150. Thus, the pointing object, which cannot be distinguished when the incident light L2 enters the photosensor portions 150 without adjusting the amount of light using the light amount adjustment portions 82, may be distinguished, and, hence, the position of the pointing object in the image display area 10a on the display surface 302s may be located.

In addition, because each of the plurality of light amount adjustment portions 82 is able to adjust the amount of light separately, even when the intensity of the incident light L2 that includes outside light varies from area to area within the image display area 10a, the amount of light may be selectively adjusted for an area in which the amount of light falls outside the detectable range of the photosensor portion 150. This makes it possible to more accurately detect the pointing object. Thus, because the liquid crystal device 1, which differs from an imaging apparatus, such as camera, provided with a mechanical aperture mechanism midway of the optical system, is able to adjust the amount of the incident light L2 using portion of the liquid crystal layer that is originally used to display images, the amount of the incident light L2 may be adjusted without providing a spacer for arranging an aperture mechanism in the liquid crystal device 1 and, hence, it is possible to more accurately detect the pointing object.

Each first electrode 159a is formed in the same layer on the TFT array substrate 10 as the plurality of pixel electrodes 9a that are provided respectively in the plurality of pixel portions 72 that constitute the image display area 10a. Thus, the first electrodes 159a may be formed in the same process as the process in which the pixel electrodes 9a formed of transparent conductive material, such as ITO, are formed, so that the manufacturing process of the liquid crystal device 1 may be simplified. Each second electrode 21a is portion of the opposite electrode 21, which overlaps the light receiving element 151.

The first polarizing layer 301 is formed so that an aqueous solution that contains dissolved aqueous dichromatic dye is put on an insulating film 42 while being applied with a stress in one direction and then dried. Note that the first polarizing layer 301 may be formed so that an alignment layer formed of transparent organic material, such as polyimide, is formed and then a thermotropic polymer liquid crystal that contains dichromatic dye is applied on the alignment layer with a predetermined thickness. In this case, the thermotropic polymer liquid crystal that contains dichromatic dye is applied using a spinner.

The first polarizing layer 301 and the second polarizing layer 302 each extend so as to overlap the pixel electrodes 9a. Portions of the first polarizing layer 301 and second polarizing layer 302, which overlap the pixel electrodes 9a, serve as a polarizer that selectively transmit a linearly polarized component within the display light L1 that is modulated in the image display area 10a. Thus, the polarizer that regulates the amount by which the display light L2 is transmitted to display images may be formed in the same process as the process in which the first polarizing layer 301 and the second polarizing layer 302 are formed. This simplifies the manufacturing process as compared with the case in which the polarizer is formed in a process different from the process in which the first polarizing layer 301 and the second polarizing layer 302 are formed.

The liquid crystal device 1 has an optical axis that extends along the optical axis of the first polarizing layer 301. The liquid crystal device 1 includes a third polarizing layer 303 that is provided adjacent to the TFT array substrate 10 when viewed from the photosensor portions 150 and extend so as to overlap the pixel electrodes 9a. With the third polarizing layer 303, it is possible to reliably polarize linearly the display light L1 that enters each pixel together with portions of the first polarizing layer 301, which overlap the pixel electrodes 9a. Note that the second polarizing layer 302 and the third polarizing layer 303 each are formed so that a drawn polyvinyl alcohol (PVA) is held by a protective film formed of triacetyl cellulose (TAC).

In FIG. 4 to FIG. 6, the aperture 73R displays red light L1R through a color filter 154R that can transmit red light within the light that is modulated from the display light L1 by the liquid crystal layer 50. The apertures 73G and 73B, as well as the aperture 73R, display green light LG1 and blue light LB1 through color filters 154G and 154B, respectively. Each light receiving element 151 is formed on the TFT array substrate 10 so as to face the aperture 83 in plan view. Each light receiving element 151 is formed on an insulating film 41 that is formed on the TFT array substrate 10. Each light receiving element 151 is covered with the insulating film 42.

Each light receiving element 151 is, for example, a light receiving element, such as a PIN diode that uses a semiconductor, such as a crystalline silicon or GaAs, or a photoelectric element that uses PbS, which is formed in the same process as the process in which semiconductor devices, such as the TFTs of the TFT circuits 80, are formed. Each light receiving element 151 detects incident light L2' of which the amount of incident light L2 is adjusted by a corresponding one of the light amount adjustment portions 82. As shown in FIG. 4 and FIG. 5, a shielding film 153 is a so-called black matrix that defines at least portions of peripheries of the aperture areas. Thus, with the shielding film 153, it is possible to reduce visible light L2 that is irradiated from the display surface 302s side to the semiconductor devices, such as the pixel switching TFTs 30 formed in the non-aperture area, and the TFT circuits 80 and, hence, it is possible to reduce a photo-leakage current that occurs in the TFTs 30 and the semiconductor devices included in the TFT circuits 80.

As shown in FIG. 3 to FIG. 6, the light amount adjustment portions 82 are formed on the TFT array substrate 10 in a non-aperture area that separates the aperture areas of the pixel portions 72. In addition, in the liquid crystal device 1, the three types of display light L1R, L1G and L1B are respectively emitted from the apertures 73R, 73G and 73B. Thus, according to the liquid crystal device 1, there is no possibility that the display light LR1, LG1 or LB1 is blocked by the light amount adjustment portions 82.

The liquid crystal device 1 includes the light shielding films 11 that are formed on the TFT array substrate 10 in the layer below the light receiving elements 151. The light shielding films 11 each are formed of a material, such as a metal film, having a light shielding property, and blocks visible light L1 emitted from the backlight 206 so that the visible light L1 is not irradiated to the light receiving elements 151. Thus, with the light shielding films 11, it is possible to reduce malfunction of the light receiving elements 151, which may occur because of irradiation of the display light L1. The above light shielding films 11 may be formed through the same process in the same layer as a film, having a light shielding property, such as conductive films that constitute portions of other elements or wirings formed on the TFT array substrate 10.

In addition, the light shielding films 11 extend on the TFT array substrate 10 so as to overlap the TFT circuits 80 and the pixel switching TFTs 30. Thus, with the shielding films 11, it is possible to shield the pixel switching TFTs 30 and the TFT circuits 80 against light and, hence, it is possible to reduce malfunction of the TFTs 30 and the TFT circuits 80.

The detailed configuration of each photodetector circuit 250 will now be described with reference to FIG. 7. In FIG. 7, each adjustment control TFT 130 includes a semiconductor layer 1a, contact holes 181 and 182, a source electrode 91, a drain electrode 92 and a gate electrode 3a1. The semiconductor layer 1a is, for example, a low-temperature polysilicon layer, and includes a channel region 1a' that overlaps the gate electrode 3a1, a source region 1b', and a drain region 1c'. In the channel region 1a', when the adjustment control TFT 130 is actuated, a channel is formed owing to an electric field applied from the gate electrode 3a1 that is electrically connected to the display line selection signal line 3a. Portion of an insulating film 42a that partially constitutes the insulating film 42, extending across between the gate electrode 3a1 and the semiconductor layer 1a, forms the gate insulating film of the adjustment control TFT 130. The source region 1b' and the drain region 1c' are formed on both sides of the channel region 1a' in mirror symmetry.

The gate electrode 3a1 is formed of a conductive film, such as a polysilicon film, or metal simple substance, alloy, metal silicide, or polysilicide, which, for example, includes at least one of metals, such as Ti, Cr, W, Ta, Mo, Pd or Al, or a lamination of them. The gate electrode 3a1 is provided above the channel region 1a' through the insulating film 42a so as not to overlap the source region 1b' or the drain region 1c'. Note that each adjustment control TFT 130 may have a lightly doped drain (LDD) structure such that a lightly doped source region and a lightly doped drain region are respectively formed in the source region 1b' and the drain region 1c'.

The contact holes 181 and 182 each are formed to extend through the insulating films 42a and 42b, which constitute the insulating film 42, to the semiconductor layer 1a, and are electrically connected respectively to the source region 1b' and the drain region 1c'. The source electrode 91 and the drain electrode 92 each are formed on the insulating film 42b and are electrically connected respectively to the contact holes 181 and 182. The source electrode 91 and the drain electrode 92 each are covered with an insulating film 42c. The drain electrode 92 is electrically connected through a contact hole to the first electrode 159a.

Each light receiving element 151 includes a semiconductor layer 150a, contact holes 183 and 184, an electrode 93, and an electrode 94. The semiconductor layer 150a includes an N-type semiconductor layer 150b' and a P-type semiconductor layer 150c', which are formed on the insulating film 41, and an interlayer 150a' that is formed between these semiconductor layers and that has an electrical resistance higher than these semiconductor layers. The contact holes 183 and 184 each are formed to extend through the insulating films 42a and 42b to the semiconductor layer 150a, and are electrically connected respectively to the N-type semiconductor layer 150b' and the P-type semiconductor layer 150c'. The electrode 93 and the electrode 94 each are formed on the insulating film 42b and are electrically connected respectively to the contact holes 183 and 184.

When reflected light L2 generated by outside light or the display light LR1, LG1 and LB1 being reflected on the pointing object is irradiated to the semiconductor layer 150a, an electric current flows through the light receiving elements 151 depending on the intensity of irradiated light. Light receiving signals, which are processed by the light receiving signal processing circuit 215 shown in FIG. 1, are signals, each of which corresponds to a variation in voltage that is generated depending on a photoelectric current that flows through the light receiving element 151. The light receiving signals are sequentially processed by the light receiving signal processing circuit 215 and the image processing circuit 216, so that the position, or the like, of the pointing object that points to the display surface 302s may be located, and various pieces of information may be entered through the pointing object to the liquid crystal device 1.

The reset TFT 163 of each TFT circuit 80 includes a semiconductor layer 160a, which includes a channel region 160a', a source region 160b' and a drain region 160c', contact holes 161 and 162, a source electrode 164, a drain electrode 165, and a gate electrode 163a. The reset TFT 163 is electrically connected through a wiring (not shown) to a corresponding one of the light receiving elements 151.

The detailed circuitry of each photodetector circuit 250 will now be described with reference to FIG. 8. First, for the sake of simplicity, signal lines and power lines (a photosensor reset signal line 350, a photosensor first power line 351, a photosensor second power line 352, and a photosensor line selection signal line 353) are provided for each photodetector circuit 250, and the case in which each photodetector circuit 250 may be controlled independently of the pixel portions 72 will be described. However, the display line selection signal line 3a and the capacitor electric potential line 300 are commonly used between the photodetector circuits 250 and the pixel portions 72.

Figure 8:
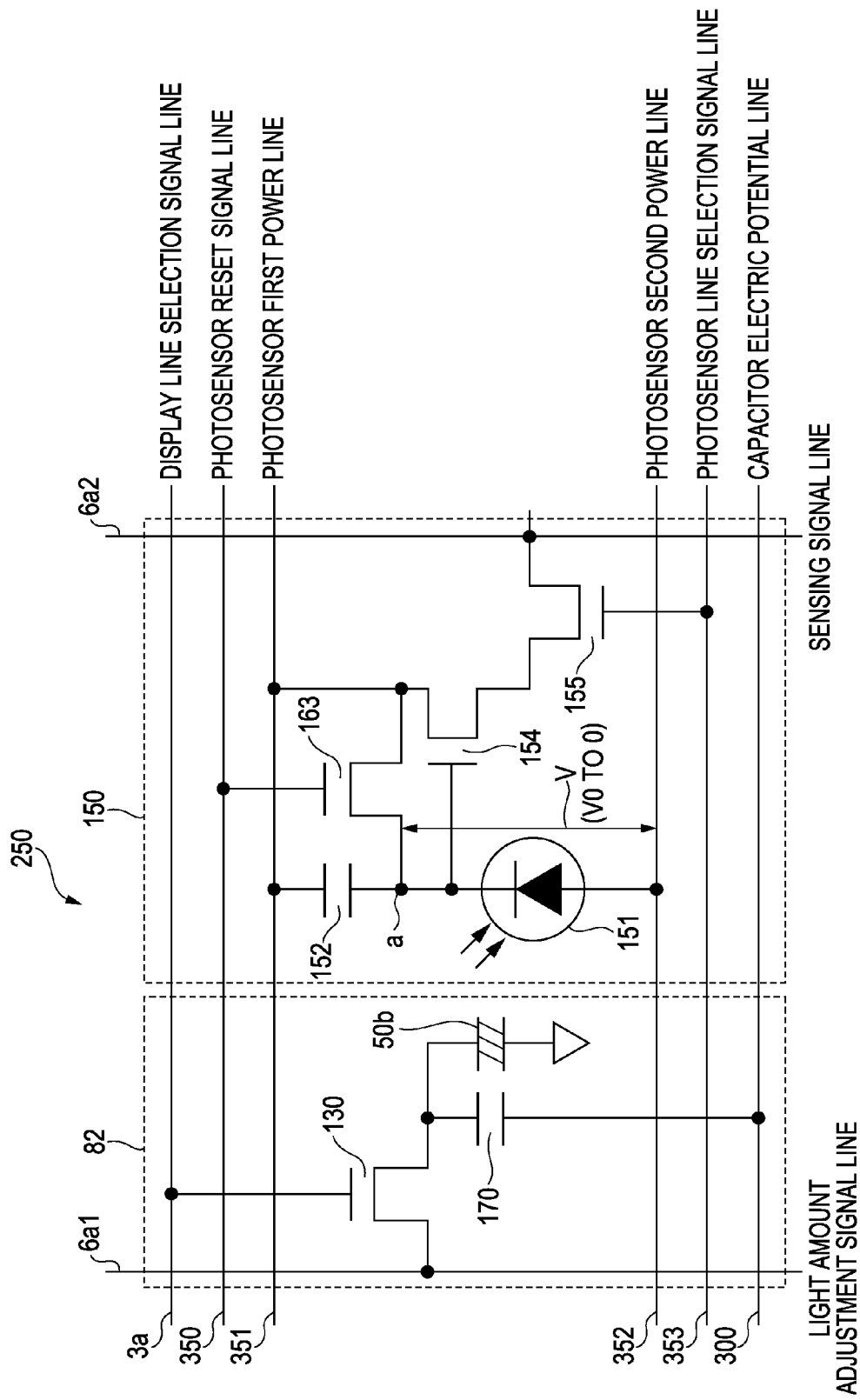
FIG. 8 is a circuit diagram that shows the electrical configuration of a photodetector circuit.

As shown in FIG. 8, each photodetector circuit 250 includes the light amount adjustment portion 82 and the photosensor portion 150. The light amount adjustment portion 82 includes the liquid crystal element 50b, the adjustment control TFT 130, and the storage capacitor 170. The light amount adjustment portion 82 is included in each of the plurality of photodetector circuits 250. The operation of the light amount adjustment portions 82 is separately controlled from one another in the image display area 10a under the control of the sensor sensitivity adjustment circuit 205. The liquid crystal element 50b is electrically connected to both the adjustment control TFT 130 and the storage capacitor 170. The liquid crystal element 50b adjusts the amount of incident light that enters the photosensor portion 150 in such a manner that the alignment state of the liquid crystal portion of the liquid crystal element 50b is controlled by the adjustment control TFT 130. One of a pair of capacitor electrodes of the storage capacitor 170 is electrically connected to the capacitor electric potential line 300.

The gate and source of the adjustment control TFT 130 are electrically connected respectively to the display line selection signal line 3a and a light amount adjustment signal line 6a1. The adjustment control TFT 130 is configured so that the on/off state may be switched by being supplied with a selection signal that is supplied through the display line selection signal line 3a. The adjustment control TFT 130 supplies the liquid crystal element 50b with an adjustment signal that is supplied through the light amount adjustment signal line 6a1 depending on the on/off state of the adjustment control TFT 130. The liquid crystal element 50b adjusts the amount of incident light that enters the photosensor portion 150 in such a manner that the alignment state of the liquid crystal portion is controlled on the basis of the adjustment signal.

The photosensor portion 150 includes the light receiving element 151, such as a photodiode, the storage capacitor 152, the reset TFT 163, a signal amplification TFT 154, and an output control TFT 155. The light receiving element 151 receives the incident light L2' (see FIG. 4 to FIG. 6), of which the amount of light is adjusted by the light amount adjustment portion 82, within the incident light L2 that enters from the display surface 302s of the liquid crystal device 1 in the image display area 10a. The source, gate and drain of the reset TFT 163 are electrically connected respectively to the light receiving element 151, the photosensor reset signal line 350, and the signal amplification TFT 154. The source, gate and drain of the signal amplification TFT 154 are electrically connected respectively to the photosensor first power line 351, the light receiving element 151, and the output control TFT 155. The source, gate and drain of the output control TFT 155 are electrically connected respectively to the signal amplification TFT 154, the photosensor line selection signal line 353, and the sensing signal line 6a2.

When the light receiving element 151 receives incident light, a photoelectric current is generated in the light receiving element 151, and then, in accordance with the operation of each of the reset TFT 163, the voltage amplification TFT 154, and the output control TFT 155, a signal corresponding to a voltage V applied between the photosensor second power line 352, which is electrically connected to the light receiving element 151, and a node a is read out onto the sensing signal line 6a2. In this manner, in the liquid crystal device 1 provided with the photodetector circuits 250, because each light amount adjustment portion 82 adjusts the sensitivity of the photosensor portion 150, it is possible to prevent malfunction at the time of position detection, and also it is possible to increase the detection accuracy.

However, because the photodetector circuits 250 are provided, there is a problem that the number of signal lines increases. That is, in addition to the display line selection signal line 3a and the capacitor electric potential line 300 that are necessary for controlling the pixel portions 72 in the existing art, as shown in FIG. 8, it is necessary to further provide the photosensor reset signal line 350, the photosensor first power line 351, the photosensor second power line 352 and the photosensor line selection signal line 353 for each scanning line. If areas for these wirings are reserved, the aperture ratios of the pixel portions 72 of the liquid crystal device 1 will decrease. In order to compensate for the decrease in the aperture ratios, if the amount of backlight is increased, power consumption increases or stray light increases in the photosensor portions 150. This will unfavorably become a noise component at the time of position detection. Then, in the present embodiment, signal lines and power lines are shared between the photodetector circuits 250 and the pixel portions 72, so that the number of signal lines and the number of power lines are reduced to thereby prevent a decrease in aperture ratios. Hereafter, a specific example embodiment will be described.

2-1: First Example Embodiment

Figure 9:
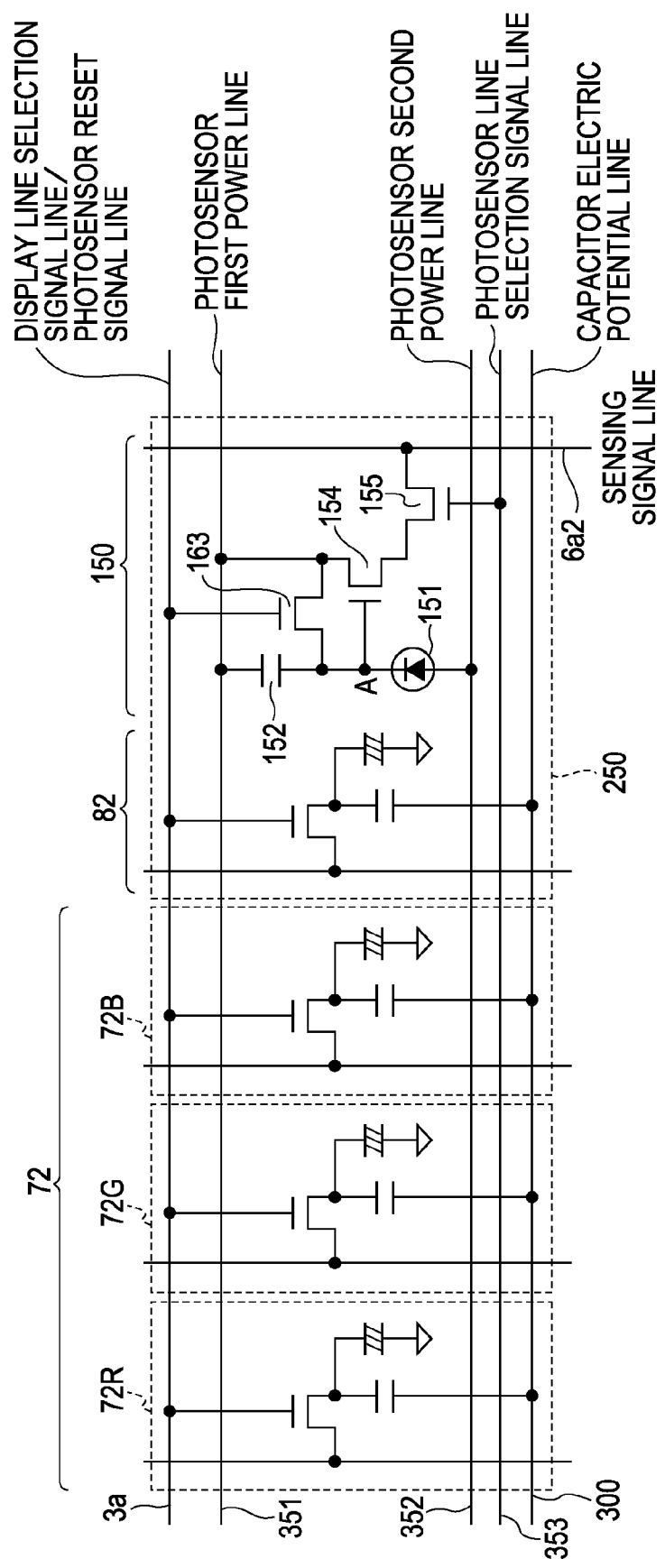
FIG. 9 is a circuit diagram that shows the configuration of a photodetector circuit according to a first example embodiment.

In the first example embodiment, the display line selection signal lines 3a are also used as photosensor reset signal lines, so that the photosensor reset signal lines 350 are omitted. FIG. 9 is a circuit diagram that shows the configuration of the first example embodiment. As shown in the drawing, the first example embodiment has the same configuration as that shown in FIG. 8, except that the gate of each reset TFT 163 is connected to the display line selection signal line 3a in the photosensor portion 150, and the photosensor reset signal lines 350 are omitted.

Figure 10:
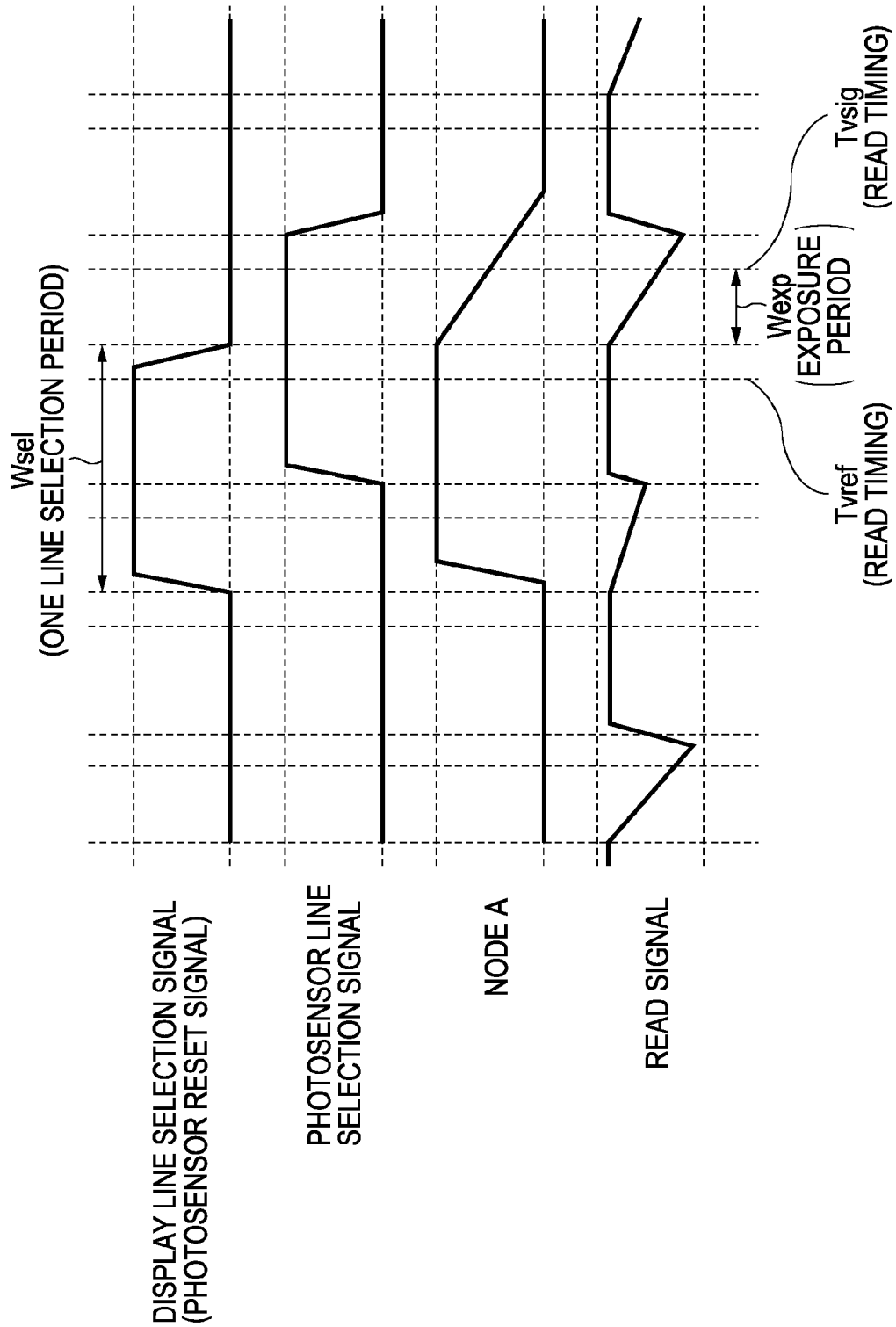
FIG. 10 is a timing chart of a photodetection process according to the first example embodiment.

FIG. 10 is a timing chart that shows the steps of photodetection process according to the first example embodiment. Note that, in the photodetection process, two photodetections are performed, that is, a reference light receiving signal is read by resetting the photosensor portion 150 and a measurement light receiving signal is read after an exposure period (Wexp), and a difference between the measurement light receiving signal and the reference light receiving signal is handled as a light receiving signal to be detected. Note that the measurement light receiving signal and the reference light receiving signal may be given in the form of voltage or may be given in the form of electric current.

In this timing chart, a display line selection signal (photosensor reset signal) is asserted to write image signals to the pixel portions 72. After that, a photosensor line selection signal is asserted to reset the photosensor portion 150, and then a reference light receiving signal corresponding to a voltage Vref of the node A is read from the photosensor portion 150. After the one line selection period Wsel has elapsed, the display line selection signal (photosensor reset signal) is negated and the exposure is initiated, and then a measurement light receiving signal corresponding to a voltage Vsig of the node A is read after the exposure period Wexp has elapsed. Then, the photosensor line selection signal is negated to complete one cycle.

Further detailed description will be made following a change of voltage of the node A over time in the drawing. As the display line selection signal (photosensor reset signal) supplied to the target display line selection signal line 3a is asserted, the reset TFT 163 enters an on state and the voltage of the node A attains the voltage of the photosensor first power line 351. Furthermore, as the photosensor line selection signal supplied to the photosensor line selection signal line 353 is asserted, a reference light receiving signal, which is a reference and corresponds to the voltage Vref, is read out onto the sensing signal line 6a2 with a certain offset voltage by passing through the voltage amplification TFT 154.

As the display line selection signal (photosensor reset signal) supplied to the display line selection signal line 3a is negated and the reset TFT 163 then enters an off state, an electric current corresponding to the intensity of received light flows through the light receiving element 151, and the voltage of the node A varies toward the voltage of the photosensor second power line 352. After a predetermined exposure period Wexp has elapsed, the voltage Vsig of the node A is read out onto the sensing signal line 6a2 as the measurement light receiving signal. A peripheral circuit (not shown) handles a difference between the measurement light receiving signal and the reference light receiving signal as a light receiving signal corresponding to the intensity of received light.

Figure 11:
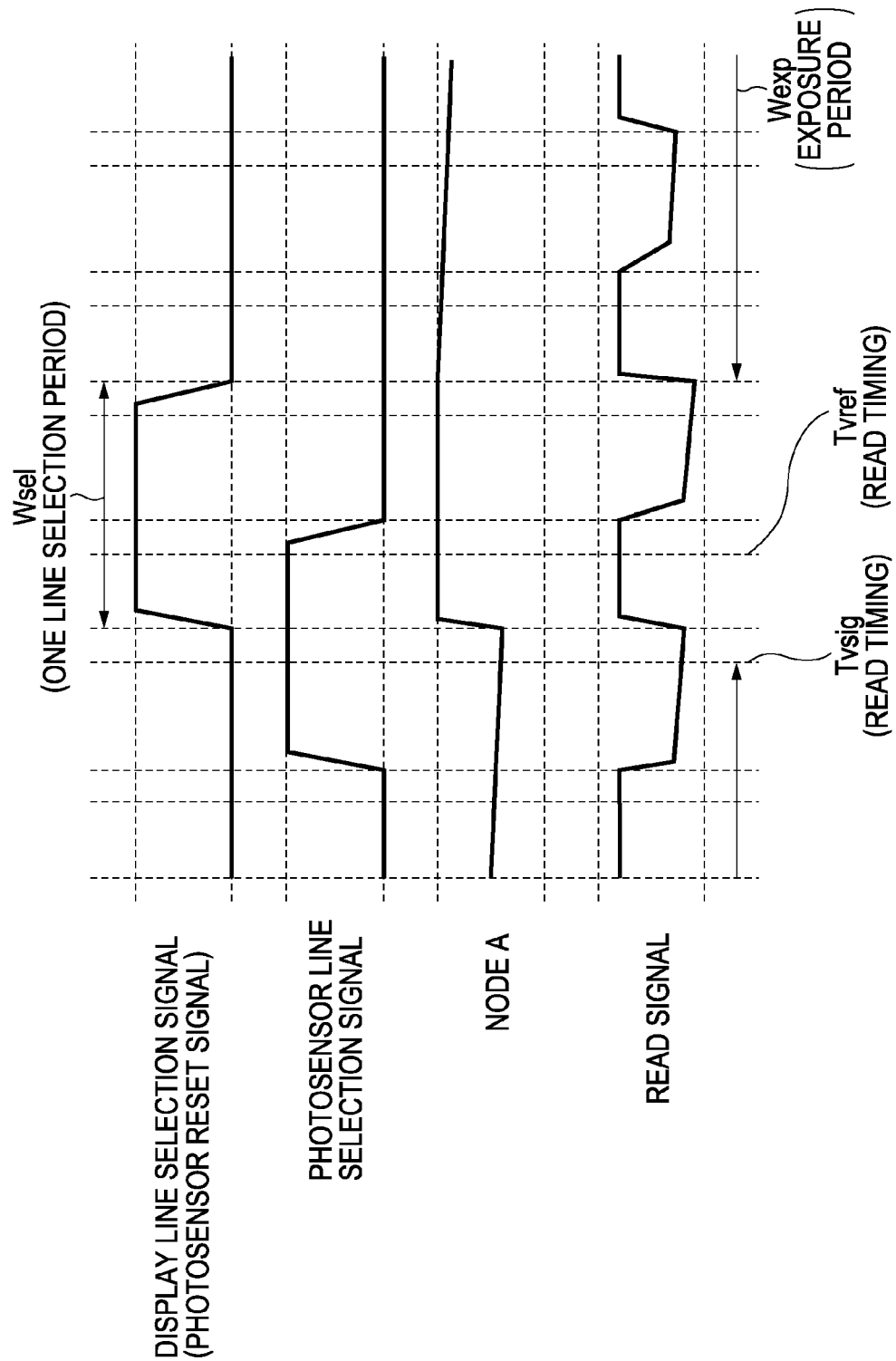
FIG. 11 is a timing chart of another example of a photodetection process according to the first example embodiment.

FIG. 11 is a timing chart that shows another example of the steps of photodetection process according to the first example embodiment. In the present example embodiment, first, the photosensor line selection signal is asserted to read the measurement light receiving signal corresponding to the voltage Vsig from the photosensor portion 150. After that, the display line selection signal (photosensor reset signal) is asserted to write image signals to the pixel portions 72 and reset the photosensor portion 150, and then the reference light receiving signal corresponding to the voltage Vref is read. After the one line selection period Wsel has elapsed, the display line selection signal (photosensor reset signal) is negated and then the exposure is initiated. During exposure, the electric potential of the node A varies toward the voltage of the photosensor second power line 352, and at a reading timing Tvsig in the next cycle, the measurement light receiving signal corresponding to the voltage Vsig is read. Therefore, the exposure period Wexp is substantially equal to the vertical scanning period.

In any examples, when the variation in voltage of the node A, resulting from receiving of light in the exposure period Wexp, takes an appropriate value, a light receiving signal corresponding to the intensity of received light is acquired. When the variation in voltage of the node A is extremely small, it is undistinguishable from various noises; whereas, when the variation in voltage of the node A is too large and exceeds the voltage of the photosensor second power line 352, a light receiving signal does not correspond to the intensity of received light.

For this reason, generally, it is conceivable that when the light intensity is large, the process using the short exposure period Wexp shown in FIG. 10 is appropriate; whereas, when the light intensity is small, the process using the long exposure period Wexp shown in FIG. 11 is appropriate. In the present example embodiment, because the display line selection signal is also used as the photosensor reset signal, the exposure period Wexp set for each photosensor portion 150 is restricted by the display timing of the pixel portions 72. Thus, the exposure period Wexp may not be freely set.

However, in the present example embodiment, because the light amount adjustment portion 82 adjusts the sensitivity of each photosensor portion 150, even when the flexibility in setting the exposure period Wexp is low, the variation in voltage of the node A may be set to an appropriate value. Thus, a light receiving signal corresponding to the intensity of received light may be acquired. Accordingly, even when the number of signal lines is reduced, it is possible to prevent malfunction at the time of position detection, and also it is possible to increase the detection accuracy.

First Alternative Embodiment

Figure 12:
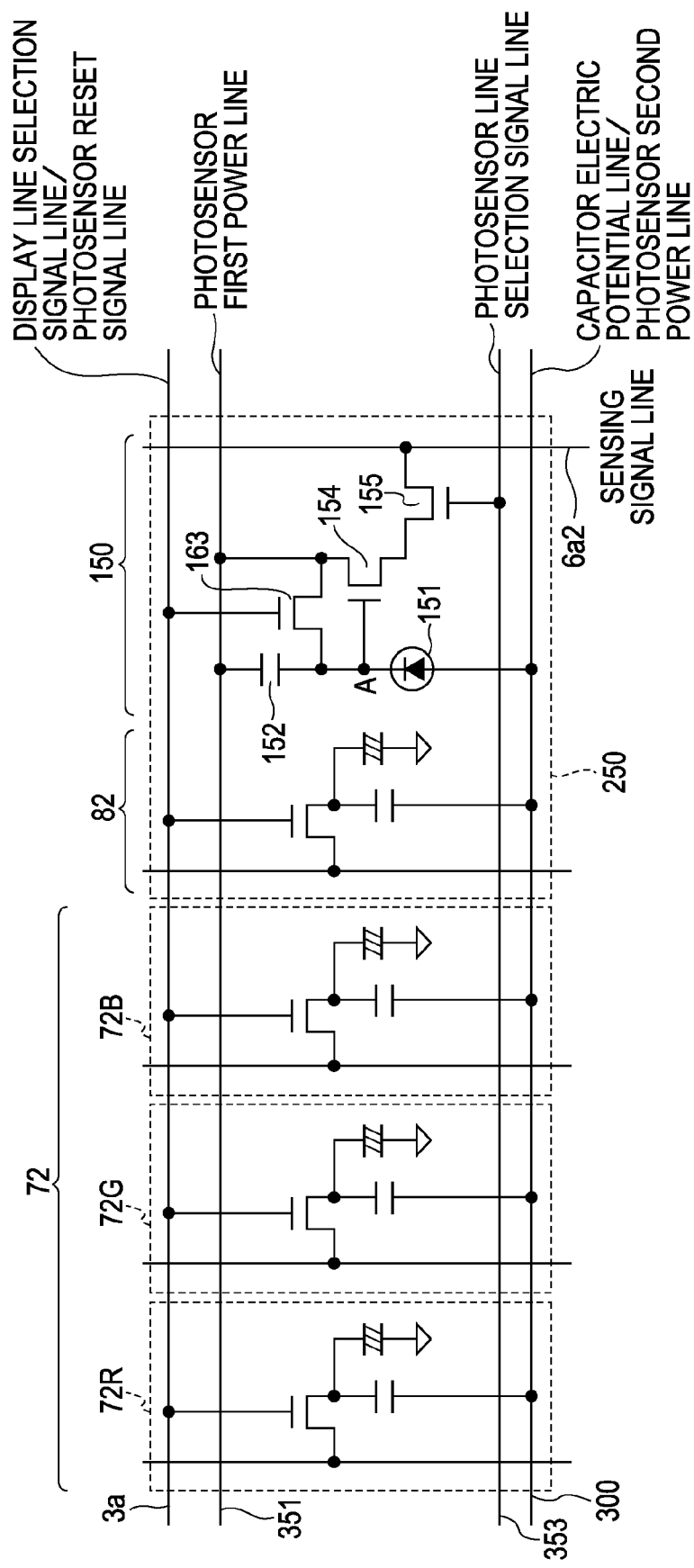
FIG. 12 is a circuit diagram that shows the configuration of a photodetector circuit according to a first alternative embodiment of the first example embodiment.

FIG. 12 is a circuit diagram that shows a first alternative embodiment of the first example embodiment. In the present alternative embodiment, the capacitor electric potential line 300 is further used as a photosensor second power line, so that, in addition to the photosensor reset signal line 350, the photosensor second power line 352 is also omitted. In this manner, it is possible to further prevent a decrease in the aperture ratio. Note that the steps of photodetection are the same as those of the first example embodiment.

Second Alternative Embodiment

Figure 13:
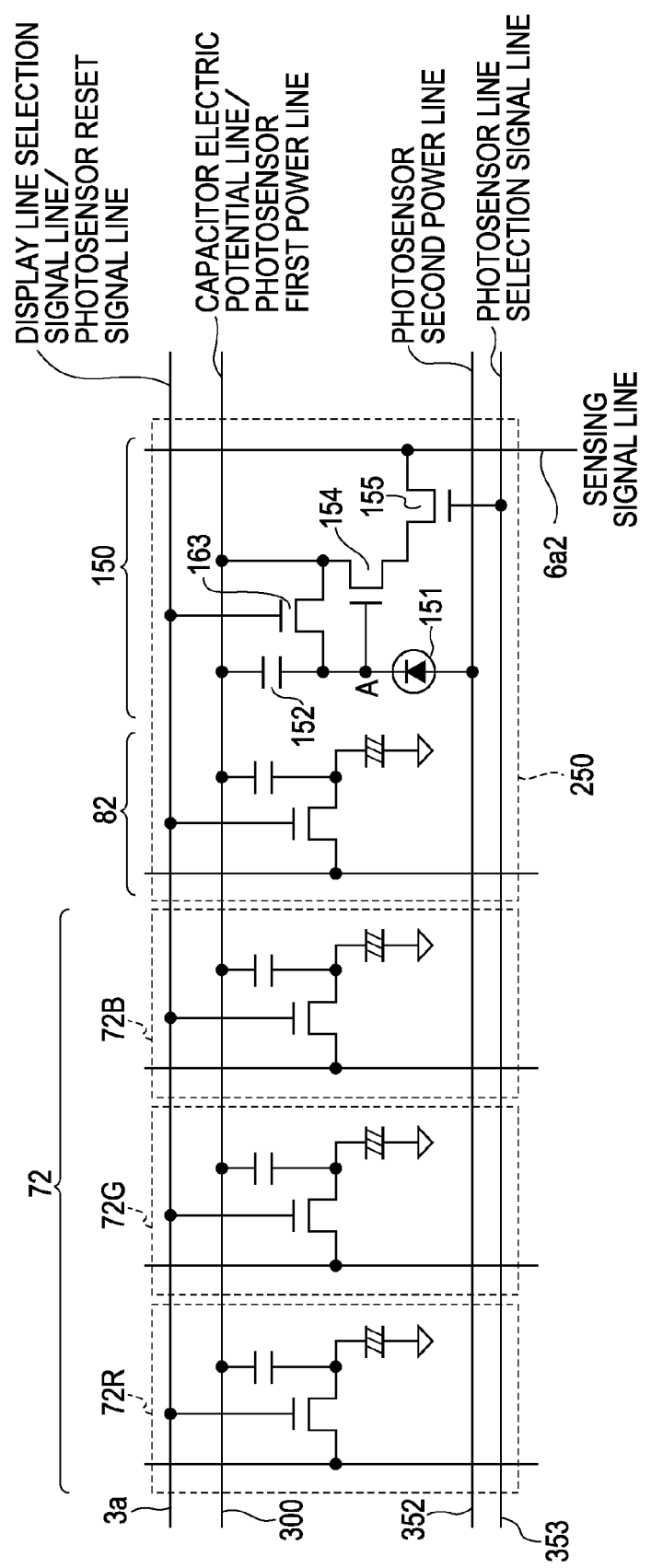
FIG. 13 is a circuit diagram that shows the configuration of a photodetector circuit according to a second alternative embodiment of the first example embodiment.

FIG. 13 is a circuit diagram that shows a second alternative embodiment of the first example embodiment. In the present alternative embodiment, the capacitor electric potential line 300 is further used as a photosensor first power line, so that, in addition to the photosensor reset signal line 350, the photosensor first power line 351 is also omitted. In this manner, it is possible to further prevent a decrease in the aperture ratio. Note that the steps of photodetection are the same as those of the first example embodiment.

2-2: Second Example Embodiment

Figure 14:
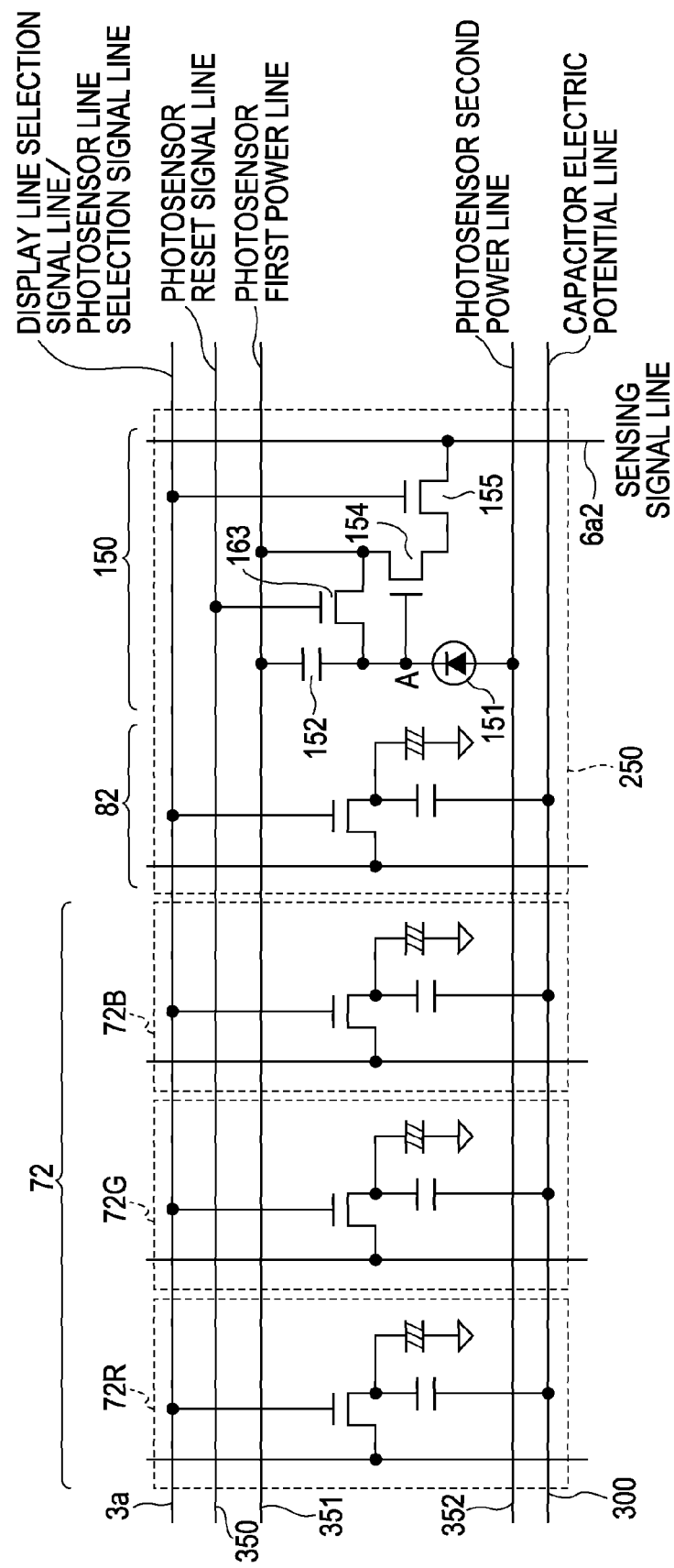
FIG. 14 is a circuit diagram that shows the configuration of a photodetector circuit according to a second example embodiment.

In the second example embodiment, the display line selection signal line 3a is also used as a photosensor line selection signal line, so that the photosensor line selection signal line 353 is omitted. FIG. 14 is a circuit diagram that shows the configuration of the second example embodiment. As shown in the drawing, the second example embodiment has the same configuration as that shown in FIG. 8, except that the gate of the output control TFT 155 is connected to the display line selection signal line 3a in the photosensor portion 150, and the photosensor line selection signal line 353 is omitted.

Figure 15:
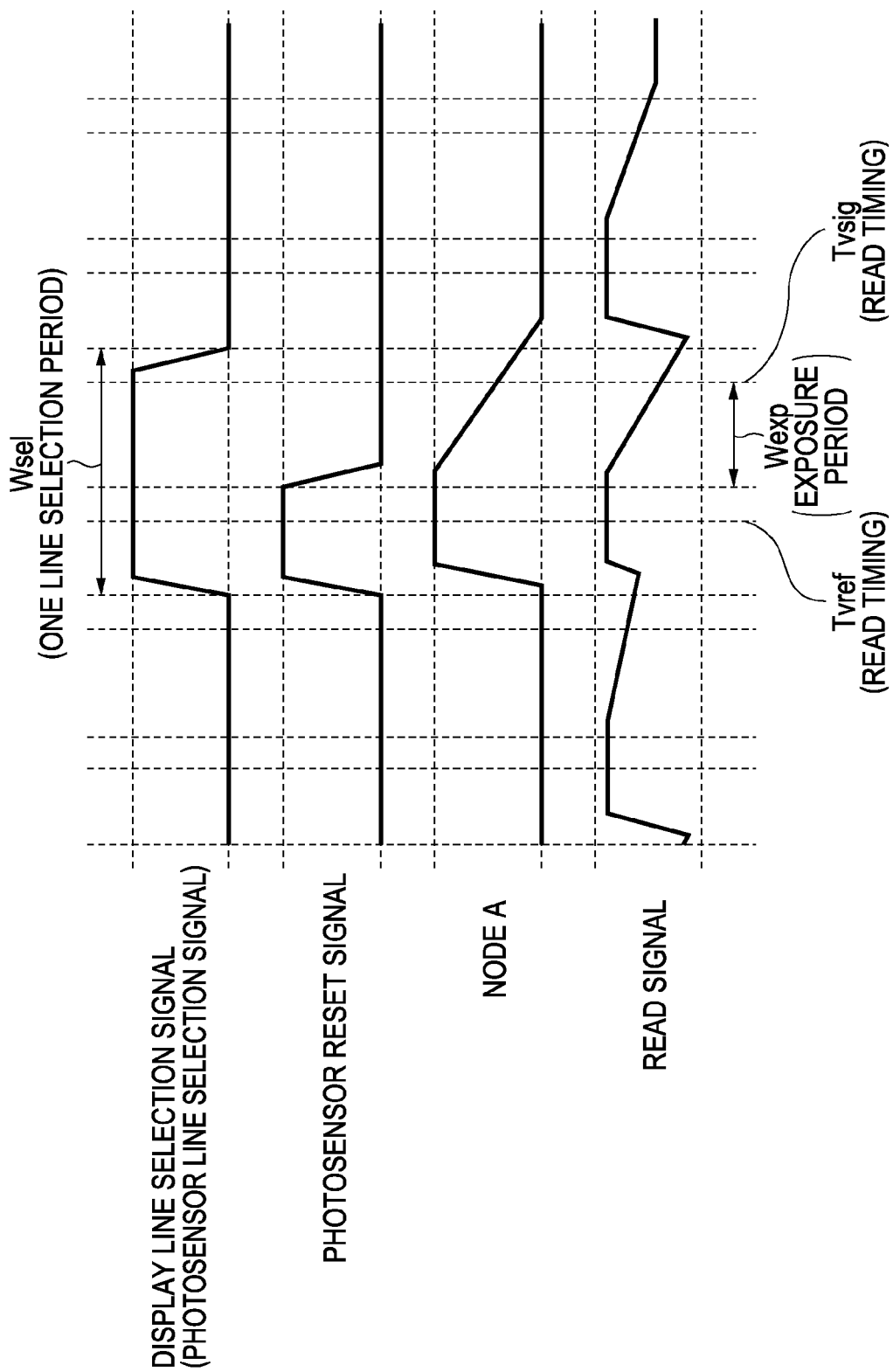
FIG. 15 is a timing chart of a photodetection process according to the second example embodiment.

FIG. 15 is a timing chart that shows the steps of photodetection process according to the second example embodiment. In this timing chart, a display line selection signal (photosensor line selection signal) and a photosensor reset signal are asserted to write image signals to the pixel portions 72 and reset the photosensor portion 150. After that, a reference light receiving signal corresponding to the voltage Vref is read, and the photosensor reset signal is then negated and the exposure is initiated. After the exposure period Wexp has elapsed, a measurement light receiving signal corresponding to the voltage Vsig is read. Then, the display line selection signal (photosensor line selection signal) is negated to complete one cycle.

Further detailed description will be made following a change of voltage of the node A over time in the drawing. As the display line selection signal (photosensor line selection signal) supplied to the target display line selection signal line 3a is asserted, the output control TFT 155 enters an on state. In addition, as the photosensor reset signal supplied to the photosensor reset signal line 350 is asserted, the voltage of the node A becomes a voltage of the photosensor first power line 351. The voltage Vref of the node A is read out onto the sensing signal line 6a2 with a certain offset voltage by passing through the voltage amplification TFT 154 as the reference light receiving signal, which is a reference.

As the photosensor reset signal is negated and the reset TFT 163 then enters an off state, an electric current corresponding to the intensity of received light flows through the light receiving element 151, and the voltage of the node A varies toward the voltage of the photosensor second power line 352. After a predetermined exposure period Wexp has elapsed before the one line selection period Wsel elapses, the measurement light receiving signal corresponding to the voltage Vsig of the node A is read out onto the sensing signal line 6a2. A peripheral circuit (not shown) handles a difference between the measurement light receiving signal and the reference light receiving signal as a light receiving signal corresponding to the intensity of received light.

Figure 16:
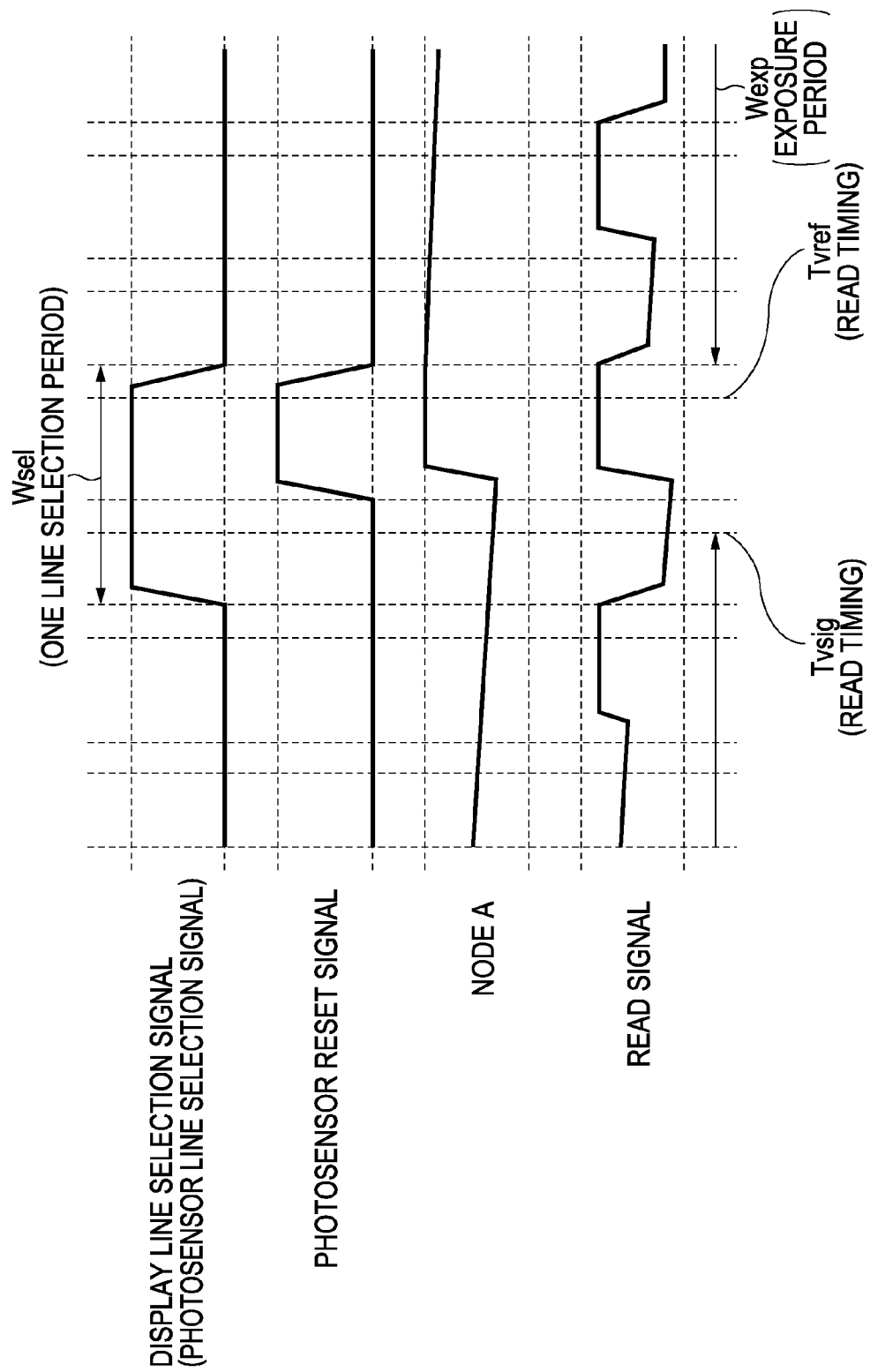
FIG. 16 is a timing chart of another example of a photodetection process according to the second example embodiment.

FIG. 16 is a timing chart that shows another example of the steps of photodetection process according to the second example embodiment. In the present example embodiment, the display line selection signal (photosensor line selection signal) is asserted to read the measurement light receiving signal corresponding to the voltage Vsig from the photosensor portion 150. After that, the photosensor reset signal is asserted to reset the photosensor portion 150, and then the reference light receiving signal corresponding to the voltage Vref is read. After the one line selection period Wsel has elapsed, the photosensor reset signal is negated and then the exposure is initiated. During exposure, the electric potential of the node A varies toward the voltage of the photosensor second power line 352, and at a reading timing Tvsig in the next cycle, the voltage Vsig is read as the measurement light receiving signal. Therefore, the exposure period Wexp is substantially equal to the vertical scanning period.

In any examples, when the variation in voltage of the node A, resulting from receiving of light in the exposure period Wexp, takes an appropriate value, a light receiving signal corresponding to the intensity of received light is acquired. When the variation in voltage of the node A is extremely small, it is undistinguishable from various noises; whereas, when the variation in voltage of the node A is too large and exceeds the voltage of the photosensor second power line 352, a light receiving signal does not correspond to the intensity of received light.

For this reason, generally, it is conceivable that when the light intensity is large, the process using the short exposure period Wexp shown in FIG. 15 is appropriate; whereas, when the light intensity is small, the process using the long exposure period Wexp shown in FIG. 16 is appropriate. In the present example embodiment, because the display line selection signal is also used as the photosensor reset signal, the exposure period Wexp set for each photosensor portion 150 is restricted by the display timing of the pixel portions 72. Thus, the exposure period Wexp may not be freely set.

However, in the present example embodiment, because each light amount adjustment portion 82 adjusts the sensitivity of the photosensor portion 150, even when the flexibility in setting the exposure period Wexp is low, the variation in voltage of the node A may be set to an appropriate value. Thus, a light receiving signal corresponding to the intensity of received light may be acquired. Accordingly, even when the number of signal lines is reduced, it is possible to prevent malfunction at the time of position detection, and also it is possible to increase the detection accuracy.

First Alternative Embodiment

Figure 17:
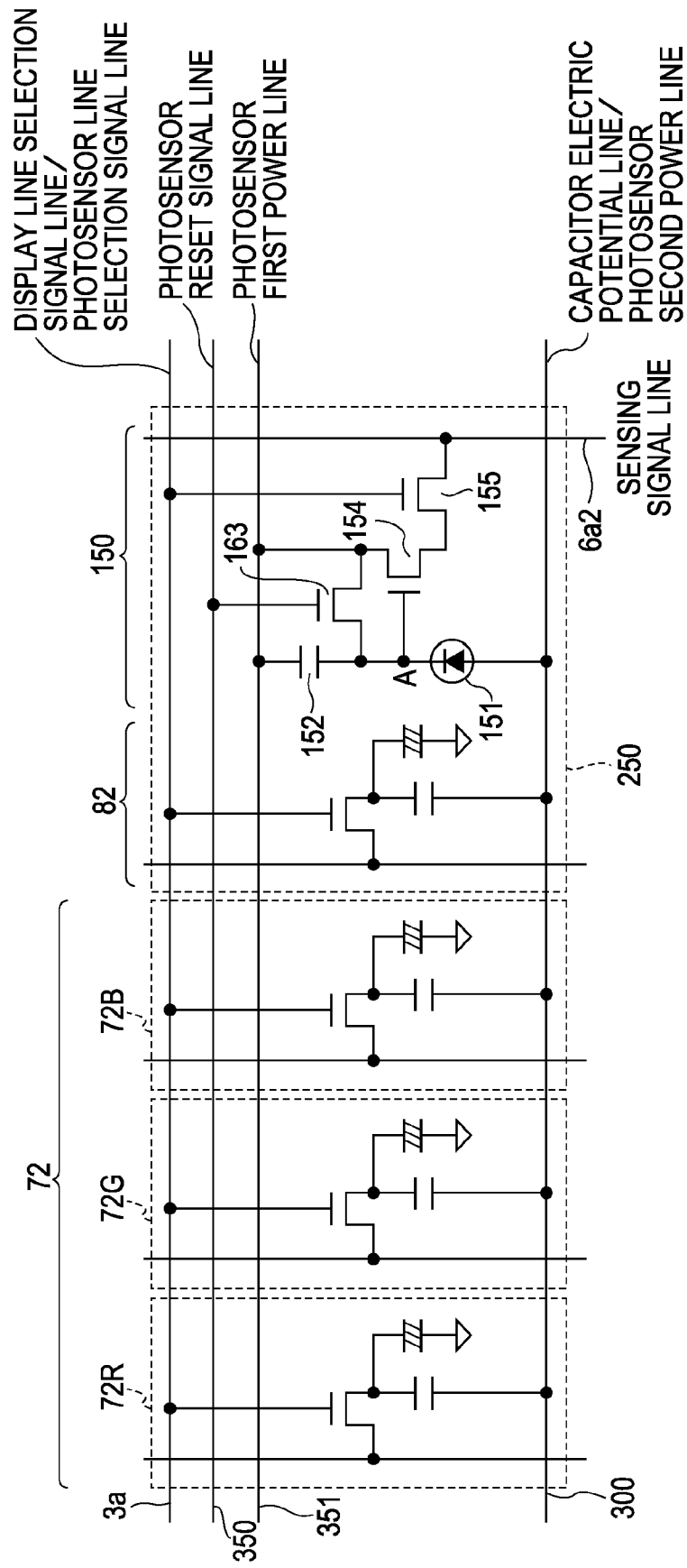
FIG. 17 is a circuit diagram that shows the configuration of a photodetector circuit according to a first alternative embodiment of the second example embodiment.

FIG. 17 is a circuit diagram that shows a first alternative embodiment of the second example embodiment. In the present alternative embodiment, the capacitor electric potential line 300 is further used as a photosensor second power line, so that, in addition to the photosensor line selection signal line 353, the photosensor second power line 352 is also omitted. In this manner, it is possible to further prevent a decrease in the aperture ratio. Note that the steps of photodetection are the same as those of the second example embodiment.

Second Alternative Embodiment

Figure 18:
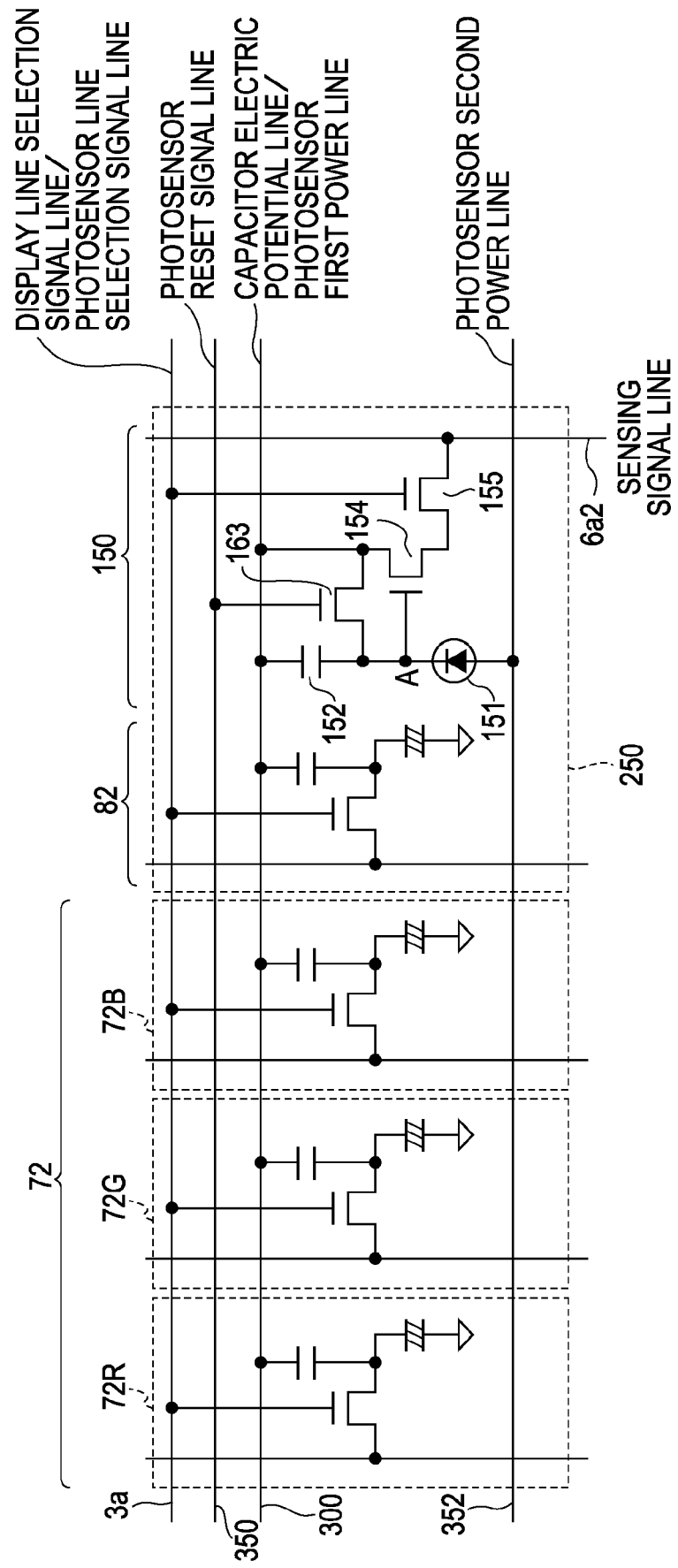
FIG. 18 is a circuit diagram that shows the configuration of a photodetector circuit according to a second alternative embodiment of the second example embodiment.

FIG. 18 is a circuit diagram that shows a second alternative embodiment of the second example embodiment. In the present alternative embodiment, the capacitor electric potential line 300 is further used as a photosensor first power line, so that, in addition to the photosensor line selection signal line 353, the photosensor first power line 351 is also omitted. In this manner, it is possible to further prevent a decrease in the aperture ratio. Note that the steps of photodetection are the same as those of the second example embodiment.

2-3: Third Example Embodiment

Figure 19:
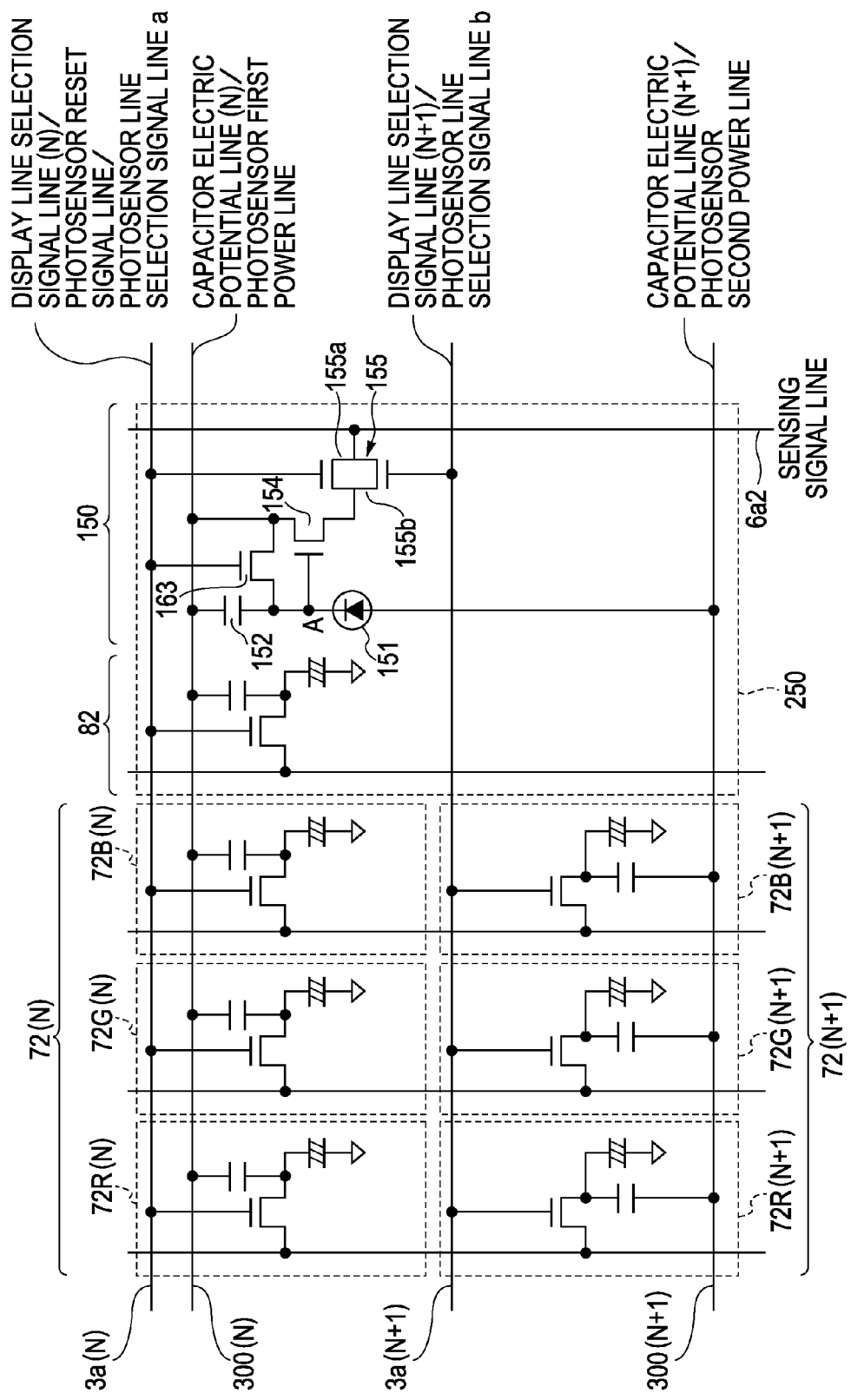
FIG. 19 is a circuit diagram that shows the configuration of a photodetector circuit according to a third example embodiment.

FIG. 19 is a circuit diagram that shows the configuration of a third example embodiment. As shown in the drawing, in the third example embodiment, one photodetector circuit 250 is arranged for the pixel portions 72 of two lines. Then, the N-th (first, third, fifth, ... ) display line selection signal lines 3a(N) are also used as a photosensor reset signal line and a photosensor line selection signal line a, and the (N+1)th display line selection signal lines 3a(N+1) are also used as a photosensor line selection signal line b. Thus, an output control TFT 155a and an output control TFT 155b are used as an output control TFT group 155. Note that it is not limited to the arrangement that one photodetector circuit 250 is arranged for the pixel portions 72 of two lines; however, one photodetector circuit 250 may be arranged for the pixel portions 72 of N lines (N is natural number).

Furthermore, the N-th capacitor electric potential lines 300 (N) are also used as a photosensor first power line, and the (N+1)th capacitor electric potential lines 300(N+1) are also used as a photosensor second power line. In this manner, the photosensor reset signal line 350, the photosensor first power line 351, the photosensor second power line 352 and the photosensor line selection signal line 353 are omitted. Each pixel portion 72 has the same configuration as that shown in FIG. 2.

Note that the voltages of the N-th capacitor electric potential lines 300(N) and the voltages of the (N+1)th capacitor electric potential lines 300(N+1) are set to different voltages because they also serve as the photosensor first power line and the photosensor second power line, respectively. Specifically, the voltages of the (N+1)th capacitor electric potential lines 300(N+1) are set to be smaller than the voltages of the N-th capacitor electric potential lines 300(N). In addition, when at least one of the display line selection signal supplied to the N-th display line selection signal lines 3a(N) and the display line selection signal supplied to the (N+1)th display line selection signal lines 3a(N+1) is asserted, a light receiving signal may be read from the sensing signal line 6a2 of the photosensor portion 150.

Figure 20:
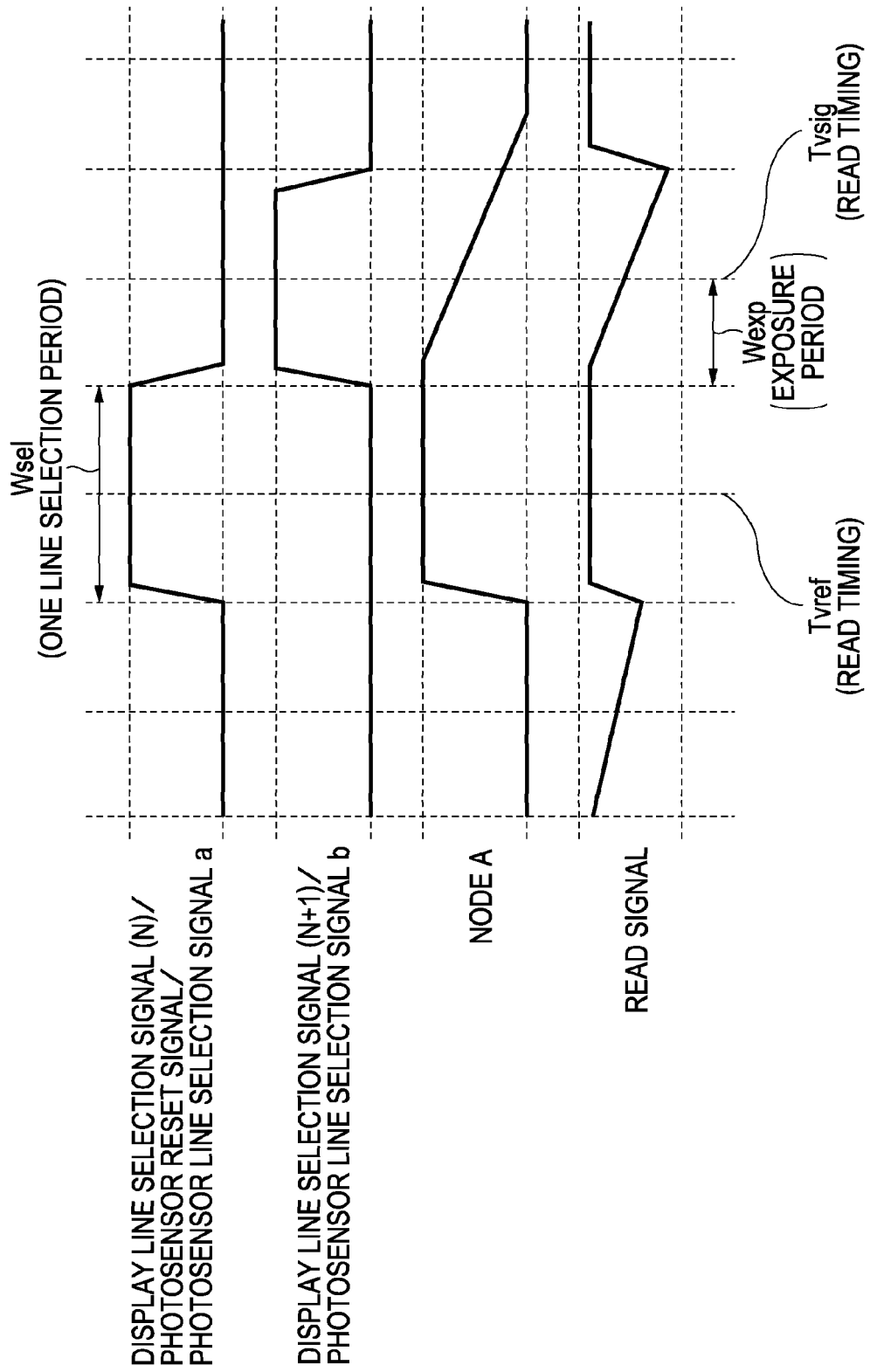
FIG. 20 is a timing chart of a photodetection process according to the third example embodiment.

FIG. 20 is a timing chart that shows the steps of photodetection process according to the third example embodiment. Note that, in the photodetection process, two photodetections are performed, that is, a reference light receiving signal is read by resetting the photosensor portion 150 and a measurement light receiving signal is read after an exposure period (Wexp), and a difference between the measurement light receiving signal and the reference light receiving signal is handled as a receiving signal to be detected. Note that the measurement light receiving signal and the reference light receiving signal may be given in the form of voltage or may be given in the form of electric current.

Description will be made following a change of voltage of the node A over time in the drawing. As the display line selection signal supplied to the N-th display line selection signal line 3a(N), which is a display target, is asserted, writing to the pixel portions 73 on the basis of display signals and writing to the light amount adjustment portion 82 on the basis of a light amount adjustment signal are performed. In addition, as the display line selection signal of the display line selection signal line 3a(N) is asserted, the reset TFT 163 enters an on state and then the voltage of the node A is reset to the voltage of the N-th capacitor electric potential line (photosensor first power line) 300(N). In addition, because the output control TFT 155a also enters an on state, the voltage of the node A is read out onto the sensing signal line 6a2 with a certain offset voltage by passing through the voltage amplification TFT 154 as a reference light receiving signal, which is a reference, corresponding to the voltage Vref.

Subsequently, as the display line selection signal of the N-th display line selection signal line 3a(N) is negated and the reset TFT 163 then enters an off state, an electric current corresponding to the intensity of received light flows through the light receiving element 151, so that the voltage of the node A varies toward the voltage of the (N+1)th capacitor electric potential line (photosensor second power line) 300(N+1). At the same time, the display line selection signal of the (N+1)th display line selection signal line 3a(N+1) is asserted and the output control TFT 155b then enters an on state, so that, after a predetermined exposure period Wexp has elapsed, the voltage Vsig of the node A is read out onto the sensing signal line 6a2 as the measurement light receiving signal. A peripheral circuit (not shown) handles a difference between the measurement light receiving signal and the reference light receiving signal as a light receiving signal corresponding to the intensity of received light. The exposure period Wexp at this time is approximately a value that is smaller than the one line selection period Wsel.

In the above steps, when the variation in voltage of the node A, resulting from receiving of light in the exposure period Wexp, takes an appropriate value, a light receiving signal corresponding to the intensity of received light is acquired. When the variation in voltage of the node A is extremely small, it is undistinguishable from various noises; whereas, when the variation in voltage of the node A is too large and exceeds the voltage of the (N+1)th capacitor electric potential line (photosensor second power line) 300(N+1), a light receiving signal does not correspond to the intensity of received light.

For this reason, an appropriate exposure period Wexp is desirably set. In the present example embodiment, because the photosensor portion 150 and the pixel portions 72 share the common signal line, the exposure period Wexp set for each photosensor portion 150 is restricted by the display timing of the pixel portions 72. Thus, the exposure period Wexp may not be freely set.

However, in the present example embodiment, because each light amount adjustment portion 82 adjusts the sensitivity of the photosensor portion 150, even when the flexibility in setting the exposure period Wexp is low, the variation in voltage of the node A may be set to an appropriate value. Thus, a light receiving signal corresponding to the intensity of received light may be acquired. Accordingly, even when the number of signal lines and the number of power lines are reduced, it is possible to prevent malfunction at the time of position detection, and also it is possible to increase the detection accuracy.

Alternative Embodiment

Figure 21:
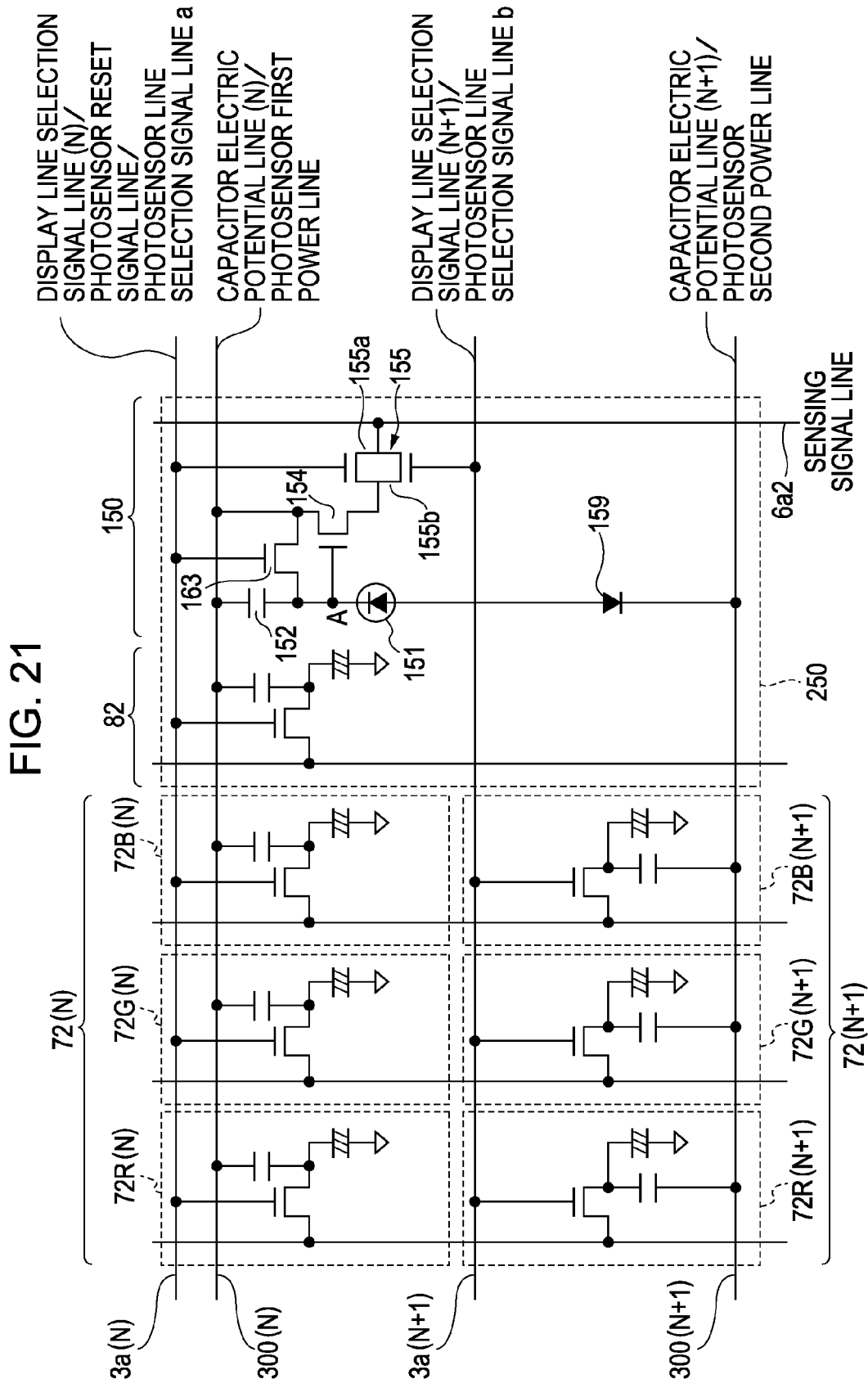
FIG. 21 is a circuit diagram that shows the configuration of a photodetector circuit according to an alternative embodiment of the third example embodiment.

In regard to a driving method of the display portion, it is generally known that two levels of voltage are prepared as the voltage of the capacitor electric potential line and are alternately switched every selected scanning line or every vertical scanning. The above driving method, which is widely employed, can reduce an output voltage range of a data driver and effectively reduces power consumption. As shown in FIG. 21, by additionally providing a diode 159 in series with the light receiving element 151, it is possible to prevent an increase in power consumption due to an electric current that flows when the light receiving element 151 is biased in a forward direction. The diode 159 may be easily implemented using a diode-connected TFT or a silicon film that constitutes a TFT.

2-4: Fourth Example Embodiment

Figure 22:
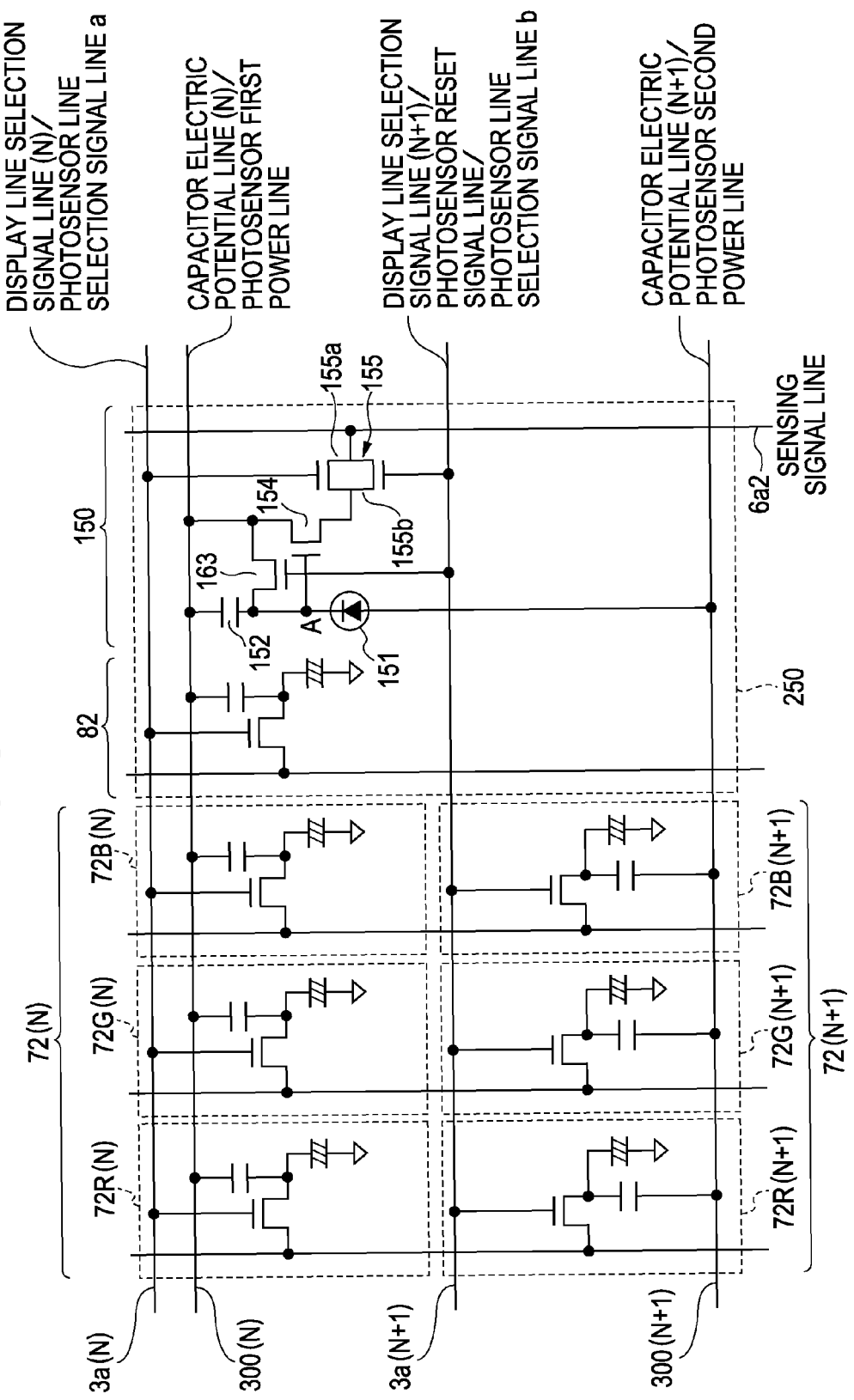
FIG. 22 is a circuit diagram that shows the configuration of a photodetector circuit according to a fourth example embodiment.

FIG. 22 is a circuit diagram that shows the configuration of a fourth example embodiment. As shown in the drawing, in the fourth example embodiment, one photodetector circuit 250 is arranged for the pixel portions 72 of two lines. Then, the N-th (first, third, fifth, . . . ) display line selection signal lines 3a(N) are also used as a photosensor line selection signal line a, and the (N+1)th display line selection signal lines 3a(N+1) are also used as a photosensor reset signal line and a photosensor line selection signal line b. Thus, an output control TFT 155a and an output control TFT 155b are used as an output control TFT group 155. Note that it is not limited to the arrangement that one photodetector circuit 250 is arranged for the pixel portions 72 of two lines; however, one photodetector circuit 250 may be arranged for the pixel portions 72 of N lines (N is natural number).

Furthermore, the N-th capacitor electric potential lines 300(N) are also used as a photosensor first power line, and the (N+1)th capacitor electric potential lines 300(N+1) are also used as a photosensor second power line. In this manner, the photosensor reset signal line 350, the photosensor first power line 351, the photosensor second power line 352 and the photosensor line selection signal line 353 are omitted. Each pixel portion 72 has the same configuration as that shown in FIG. 2.

Note that the voltages of the N-th capacitor electric potential lines 300(N) and the voltages of the (N+1)th capacitor electric potential lines 300(N+1) are set to different voltages because they also serve as the photosensor first power line and the photosensor second power line, respectively. Specifically, the voltages of the (N+1)th capacitor electric potential lines 300(N+1) are set to be smaller than the voltages of the N-th capacitor electric potential lines 300(N). In addition, when at least one of the N-th display line selection signal lines 3a(N) and the (N+1)th display line selection signal lines 3a(N+1) is asserted, a light receiving signal may be read from the sensing signal line 6a2 of the photosensor portion 150.

Figure 23:
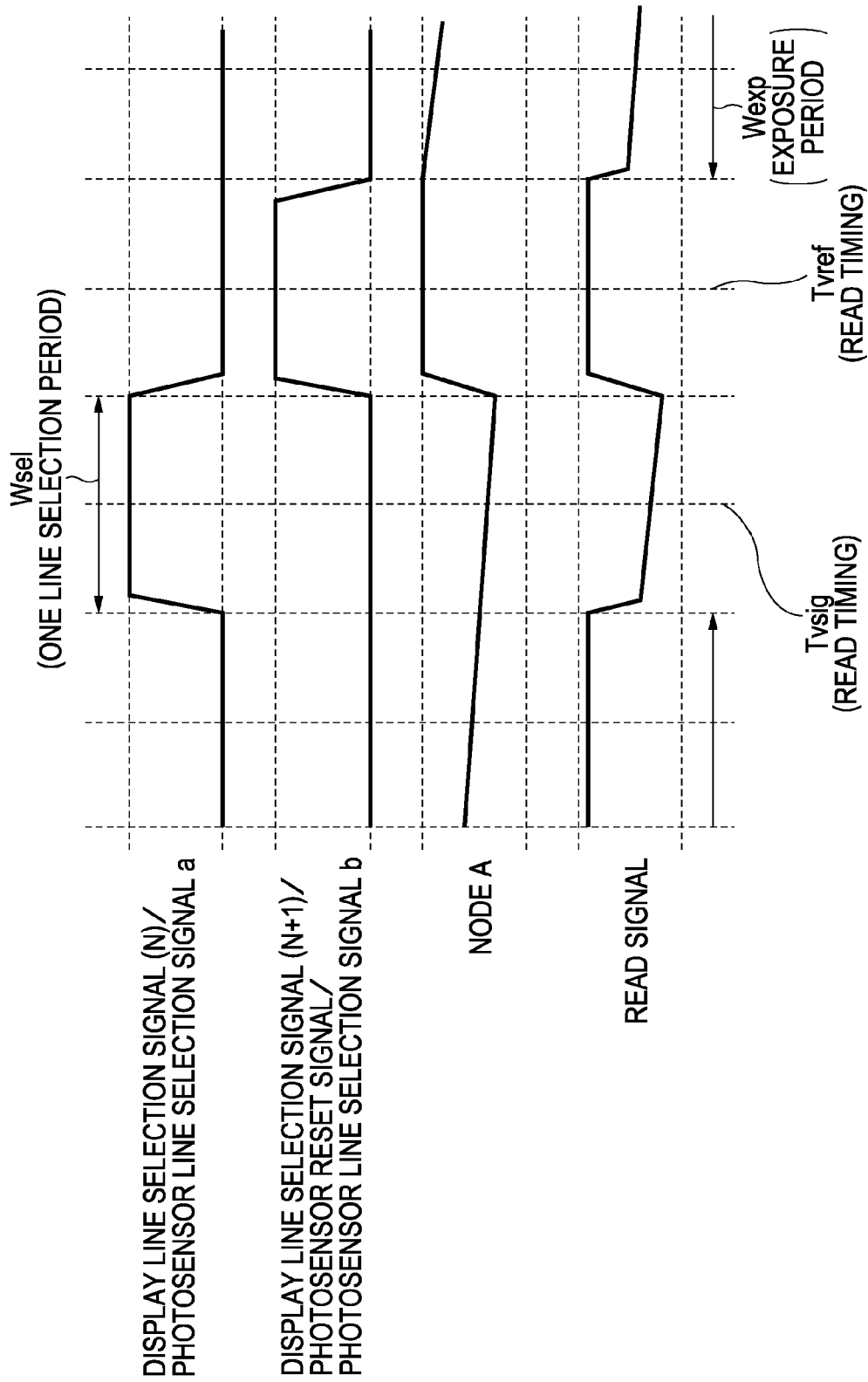
FIG. 23 is a timing chart of a photodetection process according to the fourth example embodiment.

FIG. 23 is a timing chart of the steps of photodetection process according to the fourth example embodiment. Description will be made following a change of voltage of the node A over time in the drawing. As the display line selection signal of the N-th display line selection signal line 3a(N), which is a display target, is asserted, writing to the pixel portions 73 on the basis of display signals and writing to the light amount adjustment portion 82 on the basis of a light amount adjustment signal are performed. Because the output control TFT 155a is in an on state in the photosensor portion 150, after a predetermined exposure period Wexp has elapsed since the exposure in the previous cycle has been initiated, the voltage Vsig of the node A is read out onto the sensing signal line 6a2 as the measurement light receiving signal.

Subsequently, the display line selection signal supplied to the (N+1)th display line selection signal line 3a(N+1) is asserted and the reset TFT 163 then enters an on state, so that the voltage of the node A is reset to the voltage of the N-th capacitor electric potential line (photosensor first power line) 300(N). At this time, because the output control TFT 155b is in an on state, the voltage Vref of the node A is read out onto the sensing signal line 6a2 with a certain offset voltage by passing through the voltage amplification TFT 154 as the reference light receiving signal, which is a reference. A peripheral circuit (not shown) handles a difference between the measurement light receiving signal and the reference light receiving signal as a light receiving signal corresponding to the intensity of received light. The exposure period Wexp at this time is approximately one vertical scanning period.

As the display line selection signal of the (N+1)th display line selection signal line 3a(N+1) is negated, the reset TFT 163 enters an off state and the exposure period Wexp in the present cycle is then initiated. In the exposure period Wexp, because an electric current corresponding to the intensity of received light flows through the light receiving element 151, the voltage of the node A varies toward the voltage of the (N+1)th capacitor electric potential line (photosensor second power line) 300(N+1).

In the above steps, when the variation in voltage of the node A, resulting from receiving of light in the exposure period Wexp, takes an appropriate value, a light receiving signal corresponding to the intensity of received light is acquired. When the variation in voltage of the node A is extremely small, it is undistinguishable from various noises; whereas, when the variation in voltage of the node A is too large and exceeds the voltage of the (N+1)th capacitor electric potential line (photosensor second power line) 300(N+1), a light receiving signal does not correspond to the intensity of received light.

For this reason, an appropriate exposure period Wexp is desirably set. In the present example embodiment, because the photosensor portion 150 and the pixel portions 72 share the common signal line, the exposure period Wexp set for each photosensor portion 150 is restricted by the display timing of the pixel portions 72. Thus, the exposure period Wexp may not be freely set.

However, in the present example embodiment, because each light amount adjustment portion 82 adjusts the sensitivity of the photosensor portion 150, even when the flexibility in setting the exposure period Wexp is low, the variation in voltage of the node A may be set to an appropriate value. Thus, a light receiving signal corresponding to the intensity of received light may be acquired. Accordingly, even when the number of signal lines and the number of power lines are reduced, it is possible to prevent malfunction at the time of position detection, and also it is possible to increase the detection accuracy.

Alternative Embodiment

Figure 24:
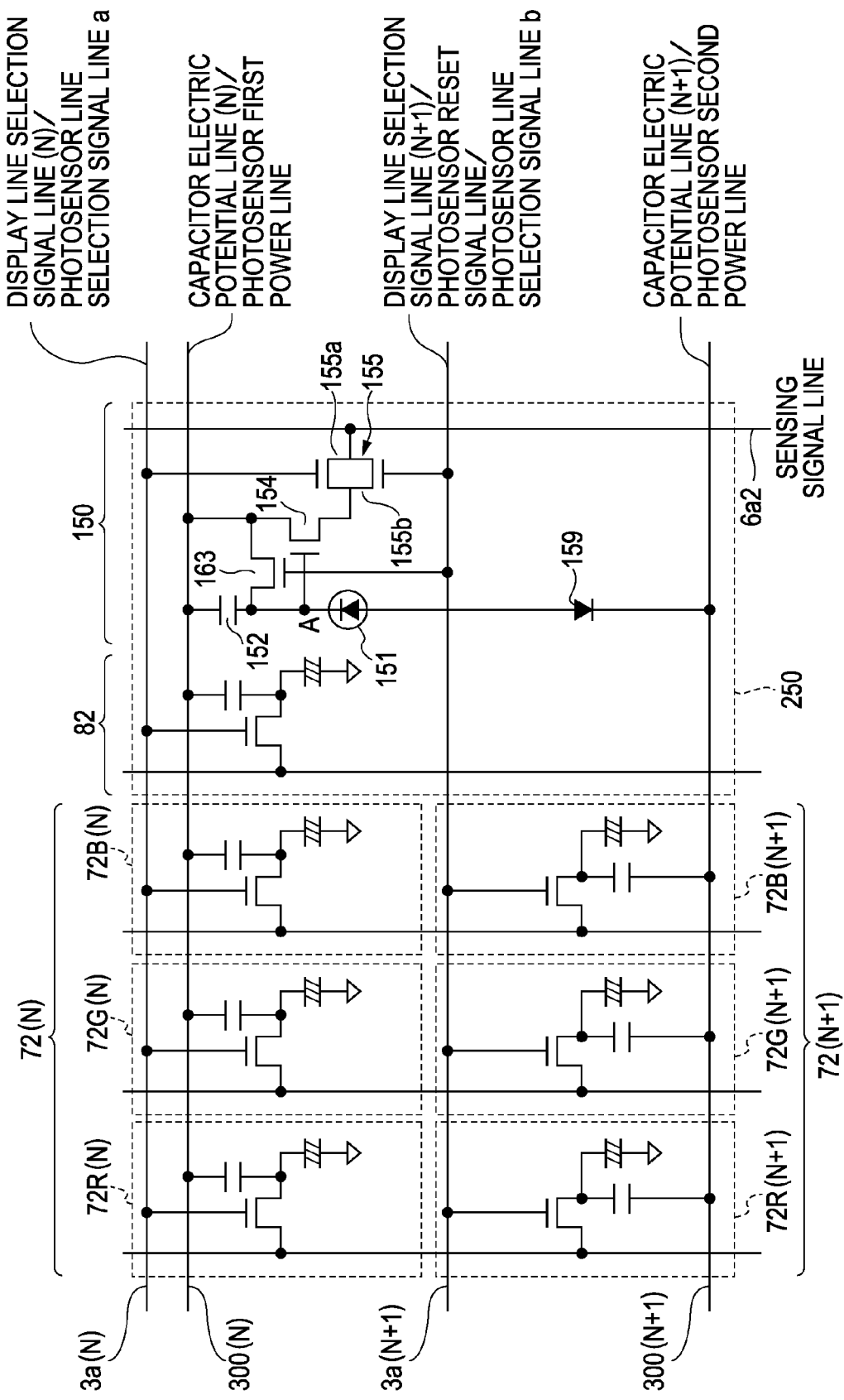
FIG. 24 is a circuit diagram that shows the configuration of a photodetector circuit according to an alternative embodiment of the fourth example embodiment.

In the fourth example embodiment as well, as shown in FIG. 24, by additionally providing a diode 159 in series with the light receiving element 151, it is possible to prevent an increase in power consumption due to an electric current that flows when the light receiving element 151 is biased in a forward direction. The diode 159 may be easily implemented using a diode-connected TFT or a silicon film that constitutes a TFT.

2-5: Other Alternative Embodiments

First Alternative Embodiment

Figure 25:
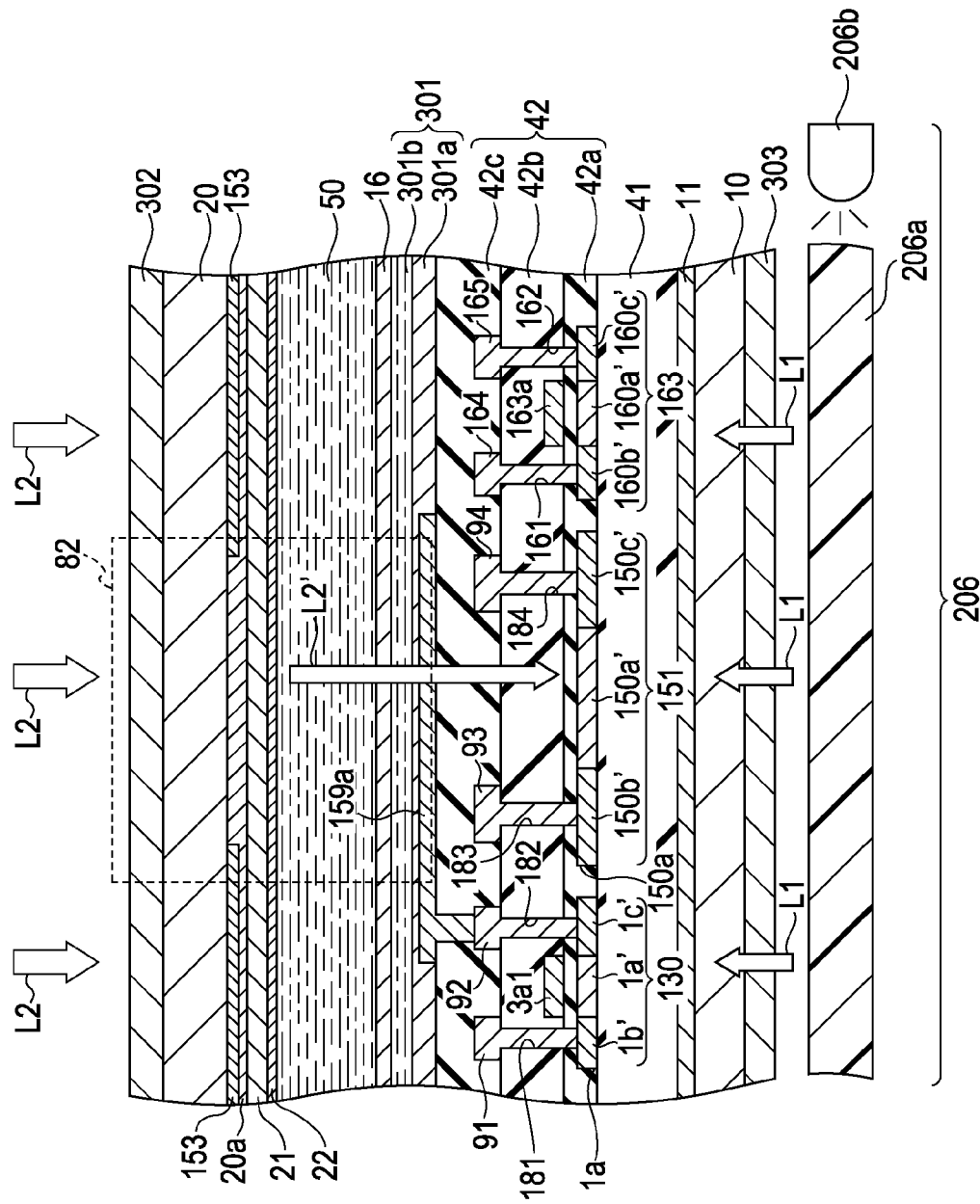
FIG. 25 is a cross-sectional view, which corresponds to FIG. 7, according to one alternative embodiment of a liquid crystal device.

An alternative embodiment of the liquid crystal device 1 will now be described in detail with reference to FIG. 25. FIG. 25 is a cross-sectional view, which corresponds to FIG. 7, according to the alternative embodiment of the liquid crystal device. Note that, in the following alternative embodiments, the same reference numerals are assigned to the same components as those of the above described liquid crystal device 1 and description thereof is omitted.

As shown in FIG. 25, in the liquid crystal device according to the present example, the first polarizing layer 301 is formed on the first electrode 159a. This is an example in which a thermotropic polymer liquid crystal that contains dichromatic dye is used as the first polarizing layer 301. The first polarizing layer 301 has a laminated structure in which an alignment layer 301a, which is used for a polarizing layer, and a dichromatic thermotropic polymer liquid crystal layer 301b are laminated. An electric field that controls the liquid crystal layer 50 is applied through the first polarizing layer 301. Because the first polarizing layer 301 is formed after the first electrode 159a is formed, the first polarizing layer 301 is able to avoid the influence of heat that is generated when the first electrode 159a is formed. Thus, it is possible to ensure desirable polarization performance.

Second Alternative Embodiment

Figure 26:
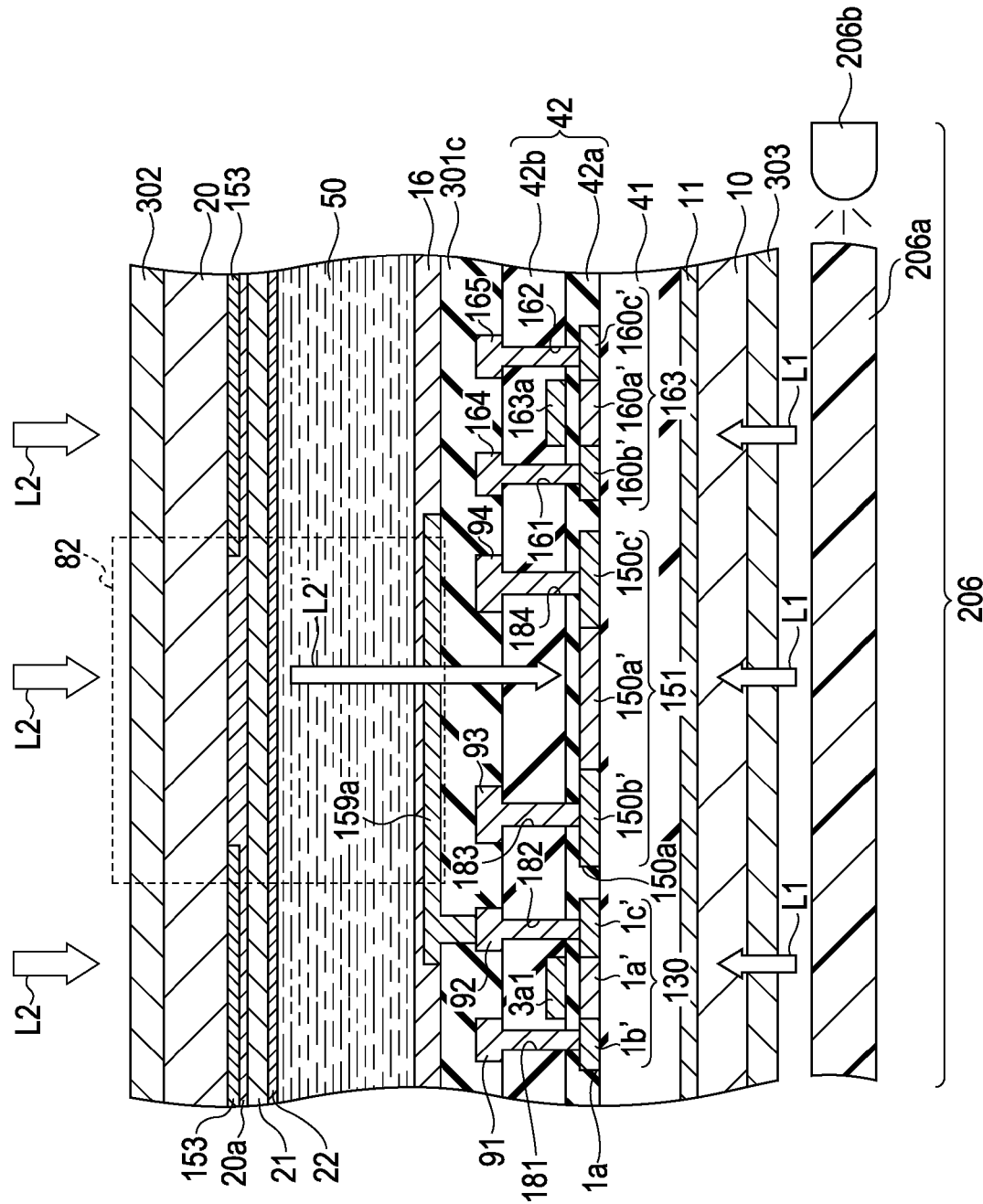
FIG. 26 is a cross-sectional view, which corresponds to FIG. 7, according to another alternative embodiment of a liquid crystal device.

Another alternative embodiment of the liquid crystal device 1 will now be described in detail with reference to FIG. 26. FIG. 26 is a cross-sectional view, which corresponds to FIG. 7, according to another alternative embodiment of the liquid crystal device. As shown in FIG. 26, a first polarizing layer 301c of the liquid crystal device according to the present example is formed on the insulating film 42b so as to have a thickness of 1 to 5 μm. The first polarizing layer 301c is also used as a planarizing insulating layer that separates the reset TFT 163 and the adjustment control TFT 130 from the first electrode 159a.

3: Electronic Apparatus

Figure 27:
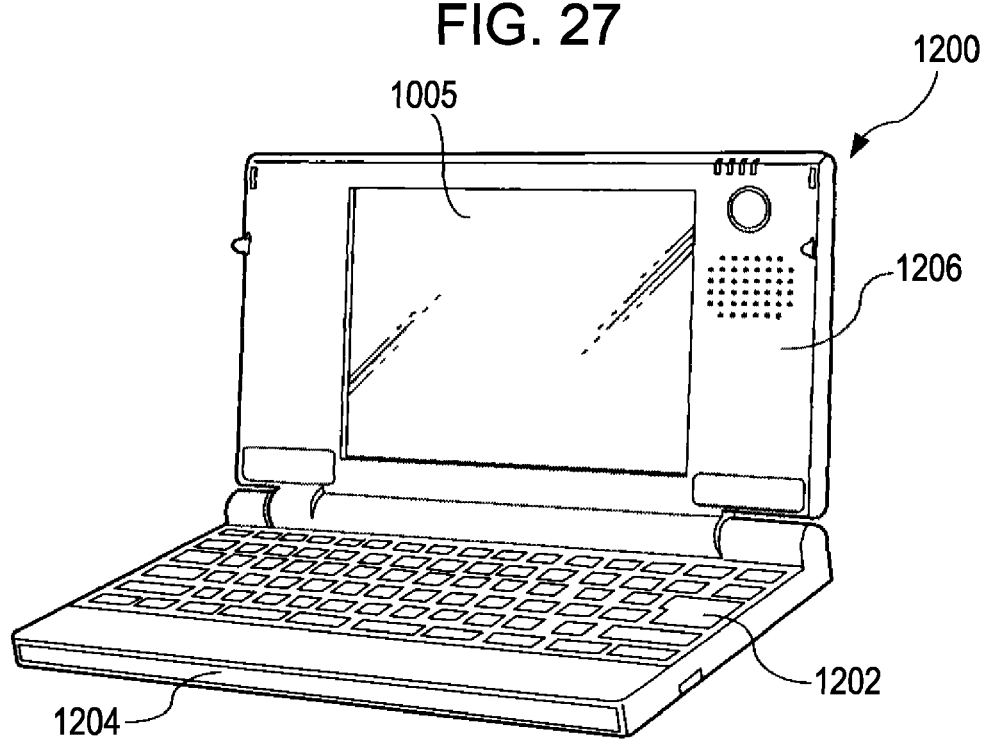
FIG. 27 is a perspective view that shows one example of an electronic apparatus according to the present embodiment.
Figure 28:
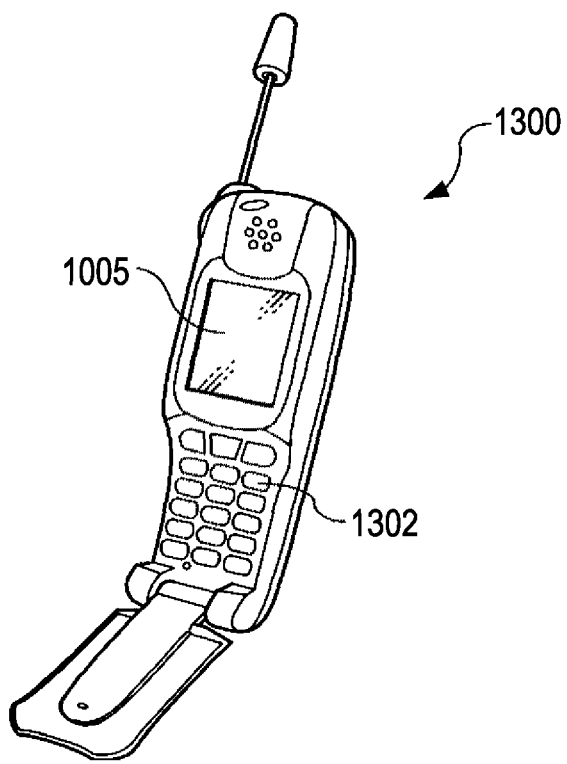
FIG. 28 is a perspective view that shows another example of an electronic apparatus according to the present embodiment.

Embodiments of an electronic apparatus that is provided with the above described liquid crystal device will now be described with reference to FIG. 27 and FIG. 28. FIG. 27 is a perspective view of a mobile personal computer to which the above described liquid crystal device is applied. As shown in FIG. 27, the computer 1200 includes a body portion 1204 having a keyboard 1202 and a liquid crystal display unit 1206 that incorporates the above described liquid crystal device. The liquid crystal display unit 1206 is formed so that a backlight is attached to the rear face of a liquid crystal panel 1005. The liquid crystal display unit 1206 has a touch panel function that allows various pieces of information to be accurately entered.

An example in which the above described liquid crystal device is applied to a cellular phone will now be described. FIG. 28 is a perspective view of a cellular phone, which is an example of an electronic apparatus according to the present embodiment. As shown in FIG. 28, the cellular phone 1300 includes a plurality of operating buttons 1302 and a reflective liquid crystal device 1005 that has the same configuration as the above described liquid crystal device. With the cellular phone 1300, it is possible to display a high-quality image and also possible to accurately enter information through the display surface using a pointing object, such as finger.

In addition, when the above described liquid crystal device is used as an image sensor, it is possible to not only locate the position of a pointing object, such as finger, on the display surface but also distinguish portion of an area on the display surface, occupied by a detection target, from the other area.

What is claimed is:

1. A liquid crystal device comprising:
    a selection line that is provided in a line direction;
    a first signal line and a second signal line that are provided in a column direction;
    a first pixel portion and a second pixel portion that are provided at positions corresponding to intersections of the selection line and the signal lines;
    a photosensor portion that is provided in correspondence with the second pixel portion;
    a first power line that is provided in the line direction; and
    a sense line that is provided in the column direction, wherein
    each of the pixel portions includes a first switching element and a liquid crystal, wherein
    the first switching element loads a display signal supplied through a corresponding one of the signal lines as a selection signal supplied through the selection line is asserted, wherein
    the liquid crystal exhibits a bright state corresponding to the display signal that is loaded by the first switching element, wherein
    the second pixel portion adjust the amounts of light that enter the photosensor portion, wherein
    the photosensor portion includes a photoelectric conversion element, a capacitive element, a second switching element, and a readout portion, wherein
    the photoelectric conversion element generates an electric current of which the magnitude corresponds to the amount of light received, wherein
    one end of the capacitive element is electrically connected to the photoelectric conversion element, wherein
    the second switching element resets the one end of the capacitive element to a reset voltage that is supplied through the first power line, wherein
    the readout portion outputs, to the sense line, an output signal of which the magnitude corresponds to a voltage of the one end of the capacitive element, and wherein
    the second switching element is controlled to any one of an on state or an off state on the basis of the selection signal that is supplied through the selection line.

2. The liquid crystal device according to claim 1, further comprising:
    a photosensor selection line that is provided in the line direction, wherein the readout portion includes a transistor and a third switching element, the transistor generates an output signal of which the magnitude corresponds to a voltage of the one end of the capacitive element, and the third switching element is provided between the transistor and the sense line and turns on as a photosensor selection signal supplied to the photosensor selection lines is asserted; and
    a control portion that controls the photosensor portion so that, after the selection signal has been asserted, the photosensor selection signal is asserted to read out a reference light receiving signal onto the sense line as the output signal and, after a predetermined time has elapsed since the selection signal has been negated, the photosensor selection signal is asserted to read out a measurement light receiving signal onto the sense line as the output signal.

3. The liquid crystal device according to claim 2, wherein the control portion outputs a difference between the reference light receiving signal and the measurement light receiving signal as a detected light receiving signal.

4. The liquid crystal device according to claim 1, further comprising:
    a photosensor selection line that is provided in the line direction, wherein each readout portion includes a transistor and a third switching element, the transistor generates an output signal of which the magnitude corresponds to a voltage of the one end of the capacitive element, and the third switching element is provided between the transistor and the sense line and enters an on state as a photosensor selection signal supplied to the photosensor selection line is asserted; and
    a control portion that controls the photosensor portion so that, after a predetermined time has elapsed since the selection signal had been switched from assertion to negation, the photosensor selection signal is asserted to read out a measurement light receiving signal onto the sense line as the output signal and, after the selection signal has been asserted, a reference light receiving signal is read out onto the sense line as the output signal.

5. The liquid crystal device according to claim 1, wherein each of the pixel portions includes a holding capacitive element that holds the display signal, wherein
    one end of the holding capacitive element is electrically connected to the first switching element, and wherein
    the other end of the holding capacitive element is electrically connected to the first power lines.

6. The liquid crystal device according to claim 1, further comprising:
    a second power line that is provided in the line direction, wherein
    the other end of the photoelectric conversion element is electrically connected to the second power line, wherein
    each of the pixel portions includes a holding capacitive element that holds the display signal, wherein
    one end of the holding capacitive element is electrically connected to the first switching element, and wherein
    the other end of the holding capacitive element is electrically connected to the second power line.

7. A liquid crystal device comprising:
    a selection line that is provided in a line direction;
    a first signal line and a second signal line that are provided in a column direction;

a first pixel portion and a second pixel portion that are provided at position corresponding to intersections of the selection line and the signal lines;
a photosensor portion that is provided in correspondence with the second pixel portion;
a first power line that is provided in the line direction; and
a sense line that is provided in the column direction, wherein
each of the pixel portions includes a first switching element and a liquid crystal, wherein
the first switching element loads a display signal supplied through a corresponding one of the signal lines as a selection signal supplied through the selection line is asserted, wherein
the liquid crystal exhibits a bright state corresponding to the display signal that is loaded by the first switching element, wherein
the second pixel portion adjust the amounts of light that enter the photosensor portion, wherein
the photosensor portion includes a photoelectric conversion element, a capacitive element, a second switching element, a transistor, and a third switching element, wherein
the photoelectric conversion element generates an electric current of which the magnitude corresponds to the amount of light received, wherein
one end of the capacitive element is electrically connected to the photoelectric conversion element, wherein
the second switching element resets the one end of the capacitive element to a reset voltage that is supplied through the first power line, wherein
the transistor generates an output signal of which the magnitude corresponds to a voltage of the one end of the capacitive element, wherein
the third switching element is provided between the transistor and the sense line, and wherein
the third switching element is controlled to any one of an on state or an off state on the basis of the selection signal that is supplied through the selection line.

8. The liquid crystal device according to claim 7, further comprising:
a reset signal line that is provided in the line direction; and
a control portion that controls the photosensor portion so that, after the selection signal and a reset signal that is supplied through the reset signal line have been asserted, a reference light receiving signal is read out onto the sense line as the output signal and, after a predetermined time has elapsed since the reset signal had been negated, the selection signal is asserted to read out a measurement light receiving signal onto the sense line as the output signal.

9. The liquid crystal device according to claim 7, further comprising:
a reset signal line that is provided in the line direction; and
a control portion that controls the photosensor portion so that, after a predetermined time has elapsed since a reset signal that is supplied through the reset signal line had been switched from assertion to negation, the photosensor selection signal is asserted to read out a measurement light receiving signal onto the sense line as the output signal and, after the selection signal has been asserted, a reference light receiving signal is read out onto the sense line as the output signal.

10. A liquid crystal device comprising:
selection lines that are provided in a line direction;
signal lines that are provided in a column direction;
first pixel portions that are provided at positions corresponding to intersections of the selection lines and the signal lines;
second pixel portions that are provided at positions corresponding to intersections of the selection lines located at every K lines (K is natural number) and the signal lines;
photosensor portions that are provided in correspondence with a portion of the second pixel portions;
first power lines that are provided in the line direction; and
sense lines that are provided in the column direction, wherein
each of the first pixel portions and second pixel portions includes a first switching element and a liquid crystal, wherein
the first switching element loads a display signal supplied through a corresponding one of the signal lines as a selection signal supplied through a corresponding one of the selection lines is asserted, wherein
the liquid crystal exhibits a bright state corresponding to the display signal that is loaded by the first switching element, wherein
the portion of the second pixel portions adjust the amounts of light that enter the photosensor portions, wherein
each of the photosensor portions includes a photoelectric conversion element, a second switching element, and a readout portion, wherein
the photoelectric conversion element generates an electric current of which the magnitude corresponds to the amount of light received, wherein
the second switching element resets one terminal of the photoelectric conversion element to a reset voltage that is supplied through a corresponding one of the first power lines, wherein
the readout portion outputs, to a corresponding one of the sense lines, an output signal of which the magnitude corresponds to a voltage of the one terminal of the photoelectric conversion element, and wherein
the switching element is controlled to any one of an on state or an off state on the basis of the selection signal that is supplied through a corresponding one of the selection lines located at every K lines.

11. The liquid crystal device according to claim 10, wherein K is 1, and wherein each second switching element is controlled to any one of an on state or an off state on the basis of the selection signal that is supplied through any one of successive two selection lines.

12. The liquid crystal device according to claim 11, wherein
the readout portion includes an amplification transistor and a switching device, wherein
the amplification transistor generates an output electric current of which the magnitude corresponds to a voltage of the one terminal of the photoelectric conversion element, and wherein
the switching device is provided between the amplification transistor and a corresponding one of the sense lines, and turns on as a photosensor selection signal that is supplied to a corresponding one of the selection lines is asserted, the liquid crystal device further comprising:
a control portion that controls each photosensor portion so that, as a selection signal supplied through the selection line of the one of any successive two lines has been asserted, a reference light receiving signal is read out onto the corresponding one of the sense lines as the output current and, after a predetermined time has elapsed since the selection signal supplied through the selection line of the one of any successive two lines had been negated, a measurement light receiving signal is read out onto the corresponding one of the sense line as the output current.

13. The liquid crystal device according to claim 12, wherein
the switching device includes a third switching element and a fourth switching element, wherein
the third switching element is provided between the amplification transistor and a corresponding one of the sense lines and is controlled to any one of an on state or an off state by the selection signal that is supplied through the selection line of one of any successive two lines, and wherein
the fourth switching element is provided between the amplification transistor and the corresponding one of the sense lines and is controlled to any one of an on state or an off state by a selection signal that is supplied through the selection line of the other one of any successive two lines.

14. The liquid crystal device according to claim 13, wherein
the selection line of the one of any successive two lines is the selection line such that a selection signal supplied therethrough is asserted first between the successive two selection lines, and wherein
the control portion controls the fourth switching element so that a selection signal supplied through the selection line of the other one of any successive two lines between the successive two selection lines is asserted second to read out a measurement light receiving signal onto a corresponding one of the sense lines as the output current.

15. The liquid crystal device according to claim 13, wherein
the selection line of one of any successive two lines is the selection line such that a selection signal supplied therethrough is asserted second between the successive two selection lines, and wherein
the control portion controls the third switching element so that a selection signal that is supplied through the selection line of the other one of any successive two lines is asserted after substantially one frame period has elapsed since a selection signal that is supplied to the selection line of the one of any successive two lines had been asserted to read out a measurement light receiving signal onto a corresponding one of the sense lines as the output current.

16. The liquid crystal device according to claim 12, wherein the control portion outputs a difference between the reference light receiving signal and the measurement light receiving signal as a detected light receiving signal.

17. The liquid crystal device according to claim 10, further comprising:
a backflow prevention diode that is connected in series with the photoelectric conversion element.

18. The liquid crystal device according to claim 10, wherein
each of the first pixel portions includes a holding capacitive element that holds the display signal, wherein
one end of the holding capacitive element is electrically connected to the first switching element, and wherein
the other end of the holding capacitive element that is included in each first pixel portion of each one of successive two lines is connected to a corresponding one of the first power lines.

19. The liquid crystal device according to claim 18, further comprising:
second power lines, each of which is provided for the other one of the successive two lines, wherein
the other terminal of each photoelectric conversion element is electrically connected to the second power line of the other one of the successive two lines, and wherein
the electric potential supplied through each second power line is lower than the electric potential of a reset voltage supplied through each first power line.

20. The liquid crystal device according to claim 10, further comprising:
a capacitive element that is connected to the one terminal of the photoelectric conversion element.

* * * * *